United States Patent
Suetsuna et al.

(10) Patent No.: US 10,071,421 B2
(45) Date of Patent: *Sep. 11, 2018

(54) FLAKY MAGNETIC METAL PARTICLES, PRESSED POWDER MATERIAL, ROTATING ELECTRIC MACHINE, MOTOR, AND GENERATOR

(71) Applicant: Kabushiki Kaisha Toshiba, Minato-ku (JP)

(72) Inventors: Tomohiro Suetsuna, Kawasaki (JP); Tomoko Eguchi, Yokohama (JP); Hiroaki Kinouchi, Shinagawa (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/259,371

(22) Filed: Sep. 8, 2016

(65) Prior Publication Data

US 2017/0209924 A1    Jul. 27, 2017

(30) Foreign Application Priority Data

Jan. 22, 2016  (JP) .................................. 2016-010921
Jul. 29, 2016  (JP) .................................. 2016-149958

(51) Int. Cl.
*B22F 1/00*    (2006.01)
*B22F 5/10*    (2006.01)
(Continued)

(52) U.S. Cl.
CPC .......... *B22F 1/0055* (2013.01); *B22F 1/0062* (2013.01); *B22F 3/02* (2013.01);
(Continued)

(58) Field of Classification Search
None
See application file for complete search history.

(56) References Cited

U.S. PATENT DOCUMENTS 5,651,841 A * 7/1997 Moro ........................ H01F 1/24
148/309
6,310,837 B1 * 10/2001 Chou ............... G06K 19/06196
369/13.38

(Continued)

FOREIGN PATENT DOCUMENTS

JP    7-96694    10/1995
JP    8-51010    2/1996
(Continued)

*Primary Examiner* — Kevin M Bernatz
(74) *Attorney, Agent, or Firm* — Oblon, McClelland, Maier & Neustadt, L.L.P.

(57) ABSTRACT

The flaky magnetic metal particles of the embodiments include a plurality of flaky magnetic metal particles, each of the flaky magnetic metal particles including a first magnetic particle including a flat surface, at least one first element selected from the group consisting of Fe, Co and Ni, an average ratio between the maximum length and the minimum length in the flat surface being between 1 and 5 inclusive, an average thickness of the first magnetic particles being between 10 nm and 100 μm inclusive, an average aspect ratio of the first magnetic particles being between 5 and 10000 inclusive; and a plurality of second magnetic particles disposed on the flat surface, an average number of the second magnetic particles being five or more, an average diameter of the second magnetic particles being between 10 nm and 1 μm inclusive.

20 Claims, 18 Drawing Sheets

(51) Int. Cl.
  *B22F 9/04* (2006.01)
  *B22F 3/02* (2006.01)
  *B22F 3/24* (2006.01)
  *C22C 38/10* (2006.01)
  *C22C 38/02* (2006.01)
  *C22C 38/00* (2006.01)
  *H01F 1/03* (2006.01)
  *H02K 1/02* (2006.01)

(52) U.S. Cl.
  CPC .............. *B22F 3/24* (2013.01); *B22F 5/106* (2013.01); *B22F 9/04* (2013.01); *C22C 38/002* (2013.01); *C22C 38/02* (2013.01); *C22C 38/10* (2013.01); *H01F 1/0306* (2013.01); *H02K 1/02* (2013.01); *B22F 2003/248* (2013.01); *B22F 2009/043* (2013.01); *B22F 2202/05* (2013.01); *B22F 2302/45* (2013.01); *B22F 2303/01* (2013.01)

(56) References Cited

U.S. PATENT DOCUMENTS

| | | |
|---|---|---|
| 2007/0193657 A1 | 8/2007 | Brunner |
| 2011/0217543 A1* | 9/2011 | Suetsuna .................. B32B 5/16 428/323 |
| 2013/0228716 A1* | 9/2013 | Suetsuna .................. B22F 1/02 252/62.55 |
| 2014/0097377 A1* | 4/2014 | Igarashi .............. H01F 1/15383 252/62.54 |
| 2017/0076845 A1* | 3/2017 | Suetsuna .................. H01F 1/28 |

FOREIGN PATENT DOCUMENTS

| | | |
|---|---|---|
| JP | 10-92621 | 4/1998 |
| JP | 2004-156134 | 6/2004 |
| JP | 2013-55182 | 3/2013 |
| JP | 2013-65844 | 4/2013 |
| JP | 2014-75511 | 4/2014 |
| JP | 2015-175047 | 10/2015 |
| JP | 2017-59816 A | 3/2017 |

* cited by examiner

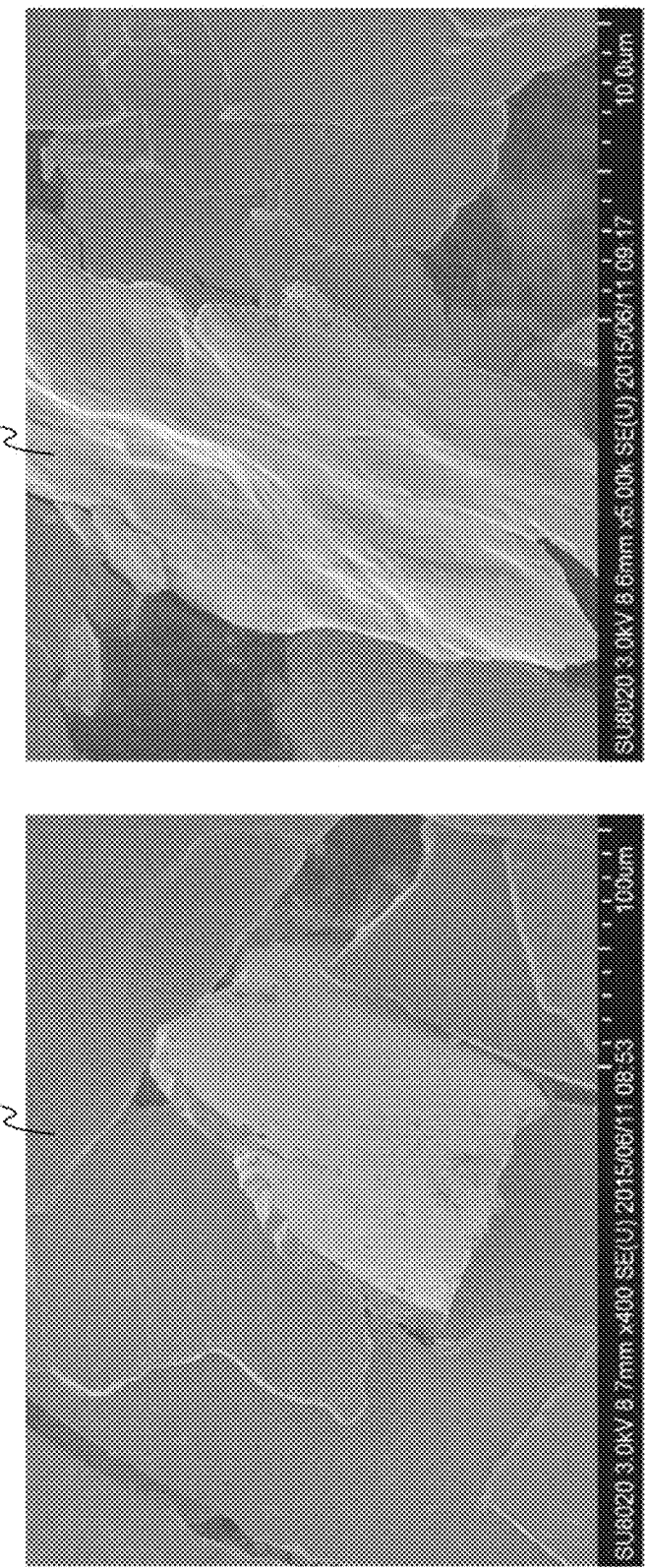

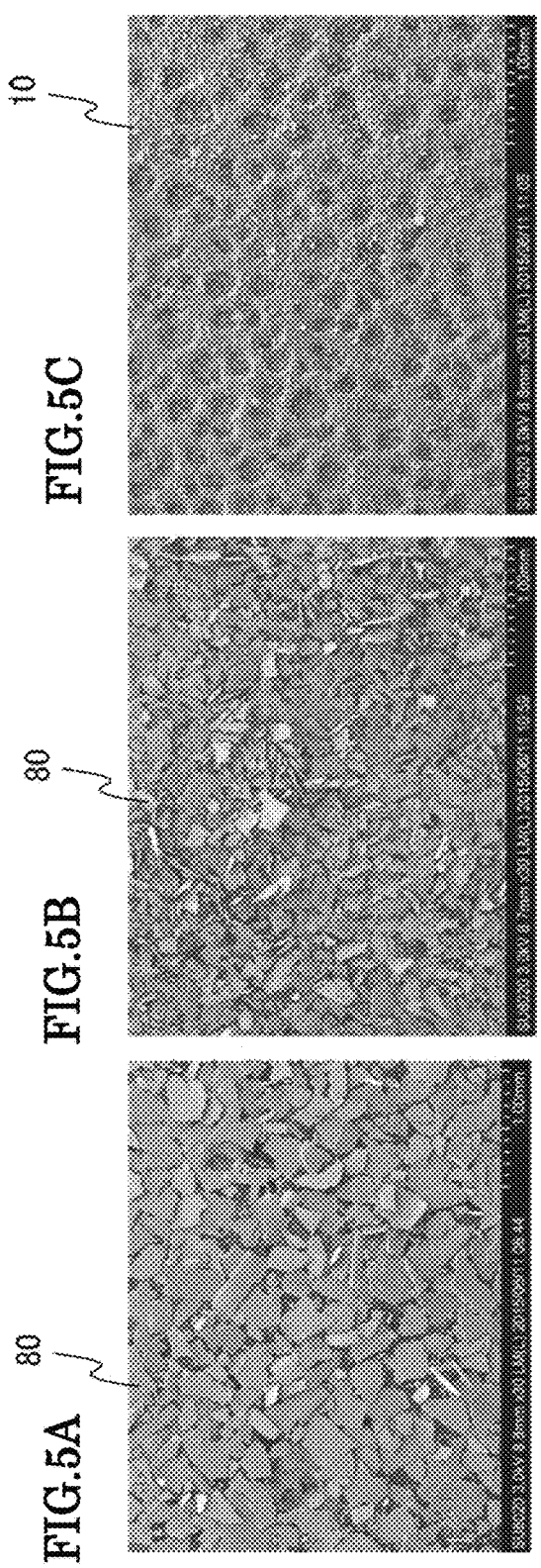

$D_{50}$=26.6μm
CV=73%

$D_{50}$=33.4μm
CV=46%

CV VALUE (%)
= [STANDARD DEVIATION OF PARTICLE SIZE DISTRIBUTION (μm) /AVERAGE PARTICLE SIZE (μm)] × 100

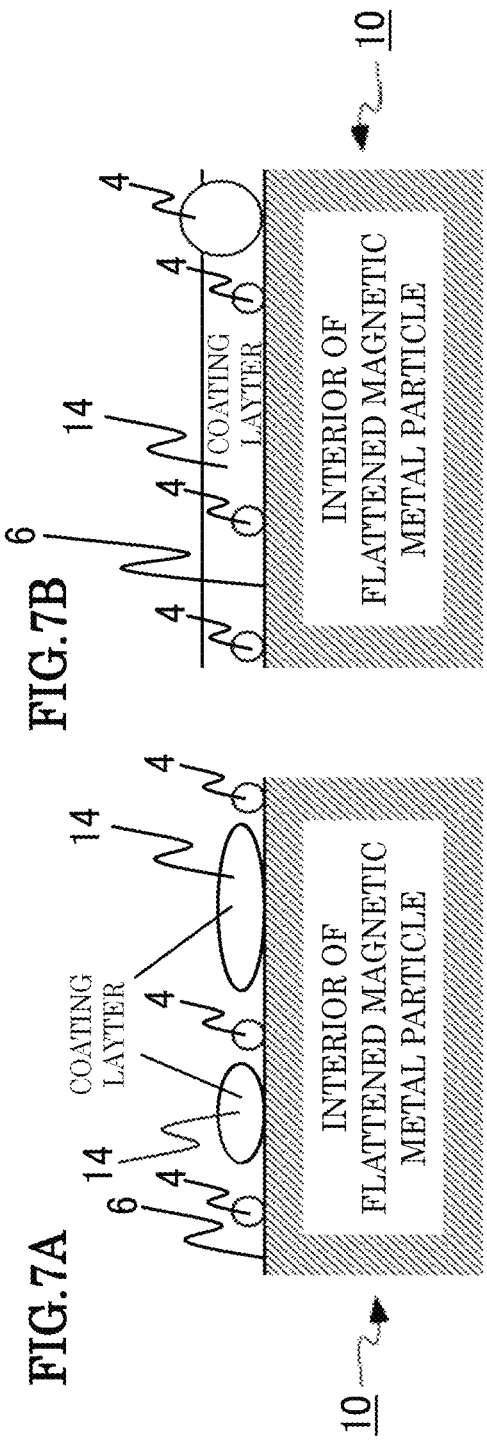

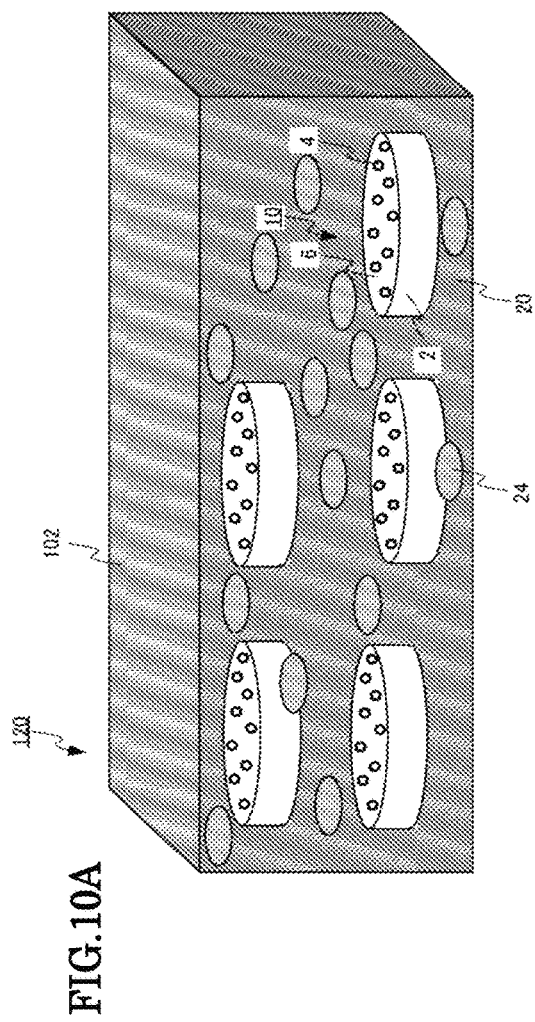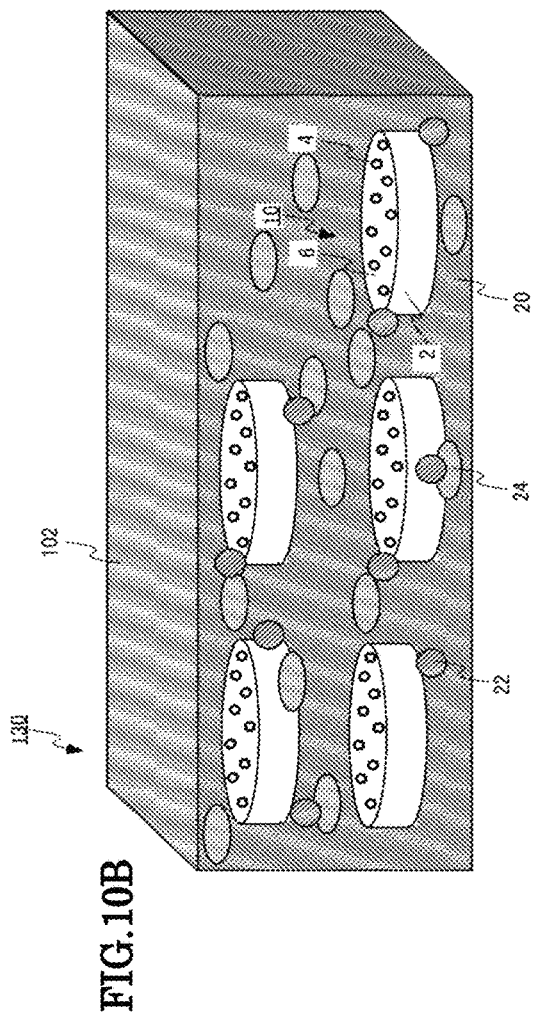
FIG.10A
FIG.10B

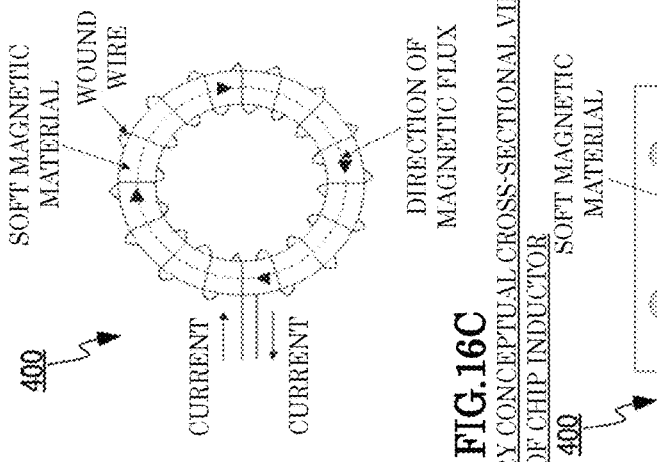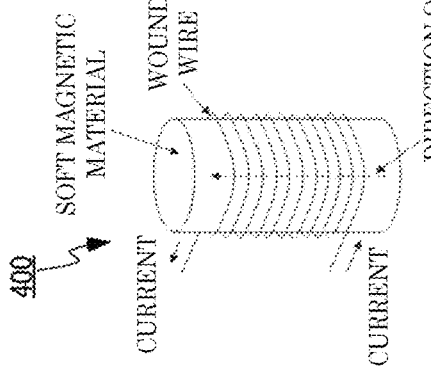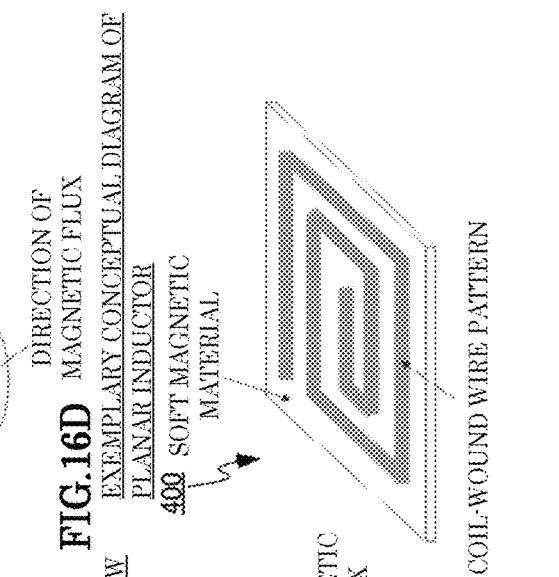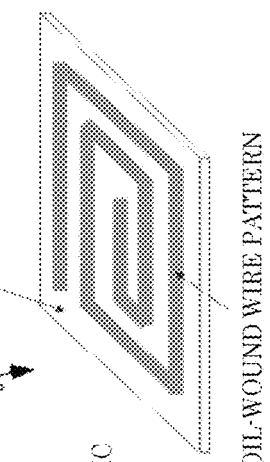
FIG. 16A EXEMPLARY CONCEPTUAL DIAGRAM OF RING-SHAPED INDUCTOR
FIG. 16B EXEMPLARY CONCEPTUAL DIAGRAM OF ROD-SHAPED INDUCTOR
FIG. 16C EXEMPLARY CONCEPTUAL CROSS-SECTIONAL VIEW DIAGRAM OF CHIP INDUCTOR
FIG. 16D EXEMPLARY CONCEPTUAL DIAGRAM OF PLANAR INDUCTOR

FLAKY MAGNETIC METAL PARTICLES, PRESSED POWDER MATERIAL, ROTATING ELECTRIC MACHINE, MOTOR, AND GENERATOR

CROSS-REFERENCE TO RELATED APPLICATION

This application is based upon and claims the benefit of priority from Japanese Patent Application No. 2016-010921, filed on Jan. 22, 2016, and Japanese Patent Application No. 2016-149958, filed on Jul. 29, 2016, the entire contents of which are incorporated herein by reference.

FIELD

Embodiments described herein relate generally to a soft magnetic material, a rotating electric machine, a motor, and a generator.

BACKGROUND

Currently, soft magnetic materials are applied to various systems and devices, such as rotating electric machines (for example, motors and generators), potential transformers, inductors, transformers, magnetic inks and antenna devices, and thus, soft magnetic materials are regarded as very important materials. In these component parts, the real part of the magnetic permeability (real part of the relative magnetic permeability), $\mu'$, of a soft magnetic material is utilized. Therefore, in the case of actual use, it is preferable to control $\mu'$ in accordance with the working frequency band. Furthermore, in order to realize a highly efficient system, it is preferable to use a material having a loss that is as low as possible. That is, it is preferable that the imaginary part of the magnetic permeability (imaginary part of the relative magnetic permeability), $\mu''$ (corresponding to a loss), is minimized as far as possible. In regard to the loss, the loss factor, $\tan \delta (=\mu''/\mu' \times 100(\%))$, serves as a criterion, and as $\mu''$ becomes smaller relative to $\mu'$, the loss factor $\tan \delta$ becomes smaller, which is preferable. In order to attain such conditions, it is preferable to make the core loss for the conditions of actual operation small, that is to say, it is preferable to make the eddy current loss, hysteresis loss, ferromagnetic resonance loss, and residual loss (other losses) as small as possible. In order to make the eddy current loss small, it is effective to increase the electrical resistance, or decrease the sizes of metal parts, or finely divide the magnetic domain structure. In order to make the hysteresis loss small, it is effective to reduce coercivity or increase the saturation magnetization. In order to make the ferromagnetic resonance loss small, it is effective to make the ferromagnetic resonance frequency higher by increasing the anisotropic magnetic field of the material. Furthermore, in recent years, since there is an increasing demand for handling of high electric power, it is required that losses be small, particularly under the operation conditions in which the effective magnetic field applied to the material is large, such as high current and high voltage. To attain this end, it is preferable that the saturation magnetization of a soft magnetic material is as large as possible so as not to cause magnetic saturation. Furthermore, in recent years, since size reduction of equipment is enabled by frequency increment, increase of the working frequency band that is utilized in systems and device equipment is underway, and there is an urgent need for the development of a magnetic material having high magnetic permeability and low losses at high frequency and having excellent characteristics.

Furthermore, in recent years, due to the heightened awareness of the issues on energy saving and environmental issues, there is a demand to increase the efficiency of systems as high as possible. Particularly, since motor systems are responsible for the greater portion of electric power consumption in the world, efficiency enhancement of motors is very important. Above all, a core and the like that constitute a motor are formed from soft magnetic materials, and it is requested to increase the magnetic permeability or saturation magnetization of soft magnetic materials as high as possible, or to make the losses as low as possible. Furthermore, in regard to the magnetic wedge that is used in some motors, there is a demand for minimizing losses as far as possible. There is the same demand also for systems using transformers. In motors, transformers and the like, the demand for size reduction is also high, along with efficiency enhancement. In order to realize size reduction, it is essential to maximize the magnetic permeability and saturation magnetization of the soft magnetic material as far as possible. Furthermore, in order to also prevent magnetic saturation, it is important to make saturation magnetization as high as possible. Moreover, the need for increasing the operation frequency of systems is also high, and thus, there is a demand to develop a material having low losses in high frequency bands.

Soft magnetic materials having high magnetic permeability and low losses are also used in inductance elements, antenna devices and the like, and among them, in recent years, attention has been paid to the application of soft magnetic materials particularly in power inductance elements that are used in power semiconductor devices. In recent years, the importance of energy saving and environmental protection has been actively advocated, and there have been demands for a reduction of the amount of $CO_2$ emission and reduction of the dependency on fossil fuels. As the result, development of electric cars or hybrid cars that substitute gasoline cars is in active progress. Furthermore, technologies for utilizing natural energy such as solar power generation and wind power generation are regarded as key technologies for an energy saving society, and many developed countries are actively pushing ahead with the development of technologies for utilizing natural energy. Furthermore, the importance of establishment of home energy management systems (HEMS) and building and energy management systems (BEMS), which control the electric power generated by solar power generation, wind power generation or the like by a smart grid and supply the electric power to homes, offices and plants at high efficiency, as environment-friendly power saving system, has been actively advocated. In such a movement of energy saving, power semiconductor devices play a key role. Power semiconductor devices are semiconductor devices that control high electric power or energy with high efficiency, and examples thereof include discrete power semiconductor devices such as an insulated gate bipolar transistor (IGBT), a metal oxide semiconductor field effect transistor (MOSFET), a power bipolar transistor and a power diode; power supply circuits such as a linear regulator and a switching regulator; and a large-scale integration (LSI) logic circuit for power management to control the above-mentioned devices. Power semiconductor devices are widely used in all sorts of equipment including electrical appliances, computers, automobiles and railways, and since expansion of the supply of these applied apparatuses, and an increase of the mounting ratio of power semiconductor devices in these apparatuses can be expected, a rapid growth in the market for power semiconductor devices in the future is anticipated. For example, inverters that are installed in many electrical appliances use power semiconductor devices nearly in all parts, and thereby extensive energy saving is made possible. Currently, silicon (Si) occupies a major part in power semiconductor devices; however, for a further increase in efficiency or further size reduction of equipment, utilizing silicon carbide (SiC) and gallium nitride (GaN) is considered effective. SiC and GaN have larger band gaps and larger breakdown fields than Si, and since the withstand voltage can be made higher, elements can be made thinner. Therefore, the on-resistance of semiconductor devices can be lowered, and it is effective for loss reduction and efficiency enhancement. Furthermore, since SiC or GaN has high carrier mobility, the switching frequency can be made higher, and this is effective for size reduction of elements. Furthermore, since SiC in particular has higher thermal conductivity than Si, the heat dissipation ability is higher, and operation at high temperature is enabled. Thus, cooling systems can be simplified, and this is effective for size reduction. From the viewpoints described above, development of SiC and GaN power semiconductor devices is actively in progress. However, in order to realize the development, development of power inductor elements that are used together with power semiconductor devices, that is, development of soft magnetic materials having high magnetic permeability (high magnetic permeability and low losses), is indispensable. In this case, regarding the characteristics required from magnetic materials, high magnetic permeability in the driving frequency bands, low magnetic loss, and high saturation magnetization that can cope with large current, are preferred. In a case in which saturation magnetization is high, it is difficult to cause magnetic saturation even if a high magnetic field is applied, and a decrease in the effective inductance value can be suppressed. As a result, the direct current superimposition characteristics of the device are improved, and the efficiency of the system is increased.

Furthermore, a magnetic material having high magnetic permeability and low losses at high frequency is expected to be applied to high frequency communication equipment devices such as antenna devices. As a method effective for size reduction of antennas and power saving, there is available a method of using an insulated substrate having high magnetic permeability (high magnetic permeability and low losses) as an antenna substrate, and performing transmission and reception of electric waves by dragging the electric waves that should reach an electronic component or a substrate inside a communication apparatus from antennas into the antenna substrate, without allowing the electric waves to reach the electronic component or substrate. As a result, size reduction of antennas and power saving are made possible, and at the same time, the resonance frequency band of the antennas can also be broadened, which is preferable.

In addition, examples of other characteristics such as high thermal stability, high strength, and high toughness are required when magnetic materials are incorporated into the various systems and devices described above. Also, in order for the magnetic materials to be applied to complicated shapes, a pressed powder is preferable to materials having a sheet shape or a ribbon shape. However, generally, in the case of the pressed powder, it is well known that characteristics such as saturation magnetization, magnetic permeability, losses, strength and toughness are not so good. Thus, enhancement of characteristics is preferable.

Next, in regard to conventional soft magnetic materials, the kinds of the soft magnetic materials and their problems will be described.

An example of an existing soft magnetic material for systems of 10 kH or less is a silicon steel sheet (FeSi). A silicon steel sheet is a material that is employed in most of rotating electric machines that have been used for a long time and handle large power, and the core materials of transformers. Highly characterized materials ranging from non-oriented silicon steel sheets to grain-oriented silicon steel sheets can be obtained, and compared to the early stage of discovery, a progress has been made; however, in recent years, it is considered that characteristics improvement has reached a limit. Regarding the characteristics, it is particularly critical to simultaneously satisfy high saturation magnetization, high magnetic permeability, and low losses. Studies on materials that surpass silicon steel sheets are actively conducted globally, mainly based on the compositions of amorphous materials and nanocrystalline materials; however, a material composition that surpasses silicon steel sheets in all aspects has not yet been found. Furthermore, studies also have been conducted on pressed powders that are applicable to complicated shapes; however, pressed powders have a defect that they have poor characteristics compared to sheets or ribbons.

Examples of conventional soft magnetic materials for systems of 10 kHz to 100 kHz include SENDUST (Fe—Si—Al), nanocrystalline FINEMET (Fe—Si—B—Cu—Nb), ribbons or pressed powders of Fe-based or Co-based amorphous glass, and MnZn-based ferrite materials. However, all of these materials do not completely satisfy characteristics such as high magnetic permeability, low losses, high saturation magnetization, high thermal stability, high strength and high toughness, and are insufficient.

Examples of conventional soft magnetic materials of 100 kHz or higher (MHz frequency band or higher) include NiZn-based ferrites and hexagonal ferrites; however, these materials have insufficient magnetic characteristics at high frequency.

From the circumstances described above, development of a magnetic material which has high saturation magnetization, high magnetic permeability, low losses, high thermal stability and excellent mechanical characteristics is preferable.

BRIEF DESCRIPTION OF THE DRAWINGS

FIGS. 4A and 4B are microscopic photographs showing magnified views of the surfaces of flaky magnetic metal particles as a comparative material of the first embodiment;

FIGS. 5A to 5C are microscopic photographs showing differences in the flaky magnetic metal particles produced according to the first embodiment, the differences being caused by differences in the technique of pulverization;

FIGS. 7A and 7B are schematic diagrams of flaky magnetic metal particles of a second embodiment;

FIGS. 10A and 10B are schematic diagrams of the pressed powder material of the third embodiment having intermediately interposed particles;

FIGS. 16A to 16D are schematic diagrams of an inductor of the fourth embodiment;

DETAILED DESCRIPTION

Figure 1B:
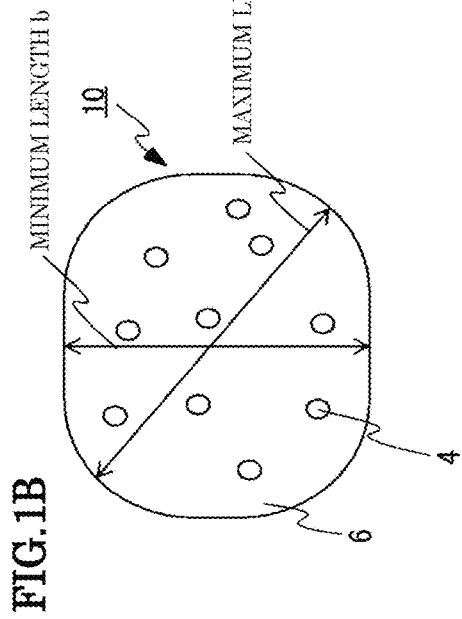
FIGS. 1A to 1D are schematic diagrams of flaky magnetic metal particles of a first embodiment.

Hereinafter, embodiments will be described using the drawings. Meanwhile, in the drawings, identical or similar sites are assigned with the same or similar reference numbers.

(First Embodiment)

A plurality of flaky magnetic metal particles, each of the flaky magnetic metal particles including: a first magnetic particle including a flat surface, at least one first element selected from the group consisting of Fe, Co and Ni, an average ratio between the maximum length and the minimum length in the flat surface being between 1 and 5 inclusive, an average thickness of the first magnetic particles being between 10 nm and 100 μm inclusive, an average aspect ratio of the first magnetic particles being between 5 and 10000 inclusive; and a plurality of second magnetic particles disposed on the flat surface, an average number of the second magnetic particles being five or more, an average diameter of the second magnetic particles being between 10 nm and 1 μm inclusive.

In regard to the thickness, the aspect ratio, the ratio of the maximum length to the minimum length, and the number of small magnetic metal particles, average values are employed in all cases. Specifically, a value obtained by averaging 10 or more values is employed.

Figure 1D:
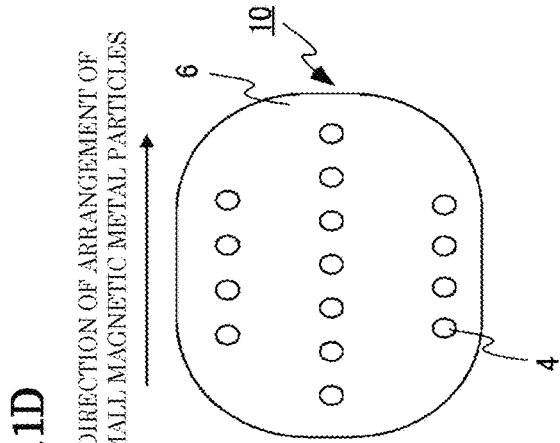
Figure 1A:
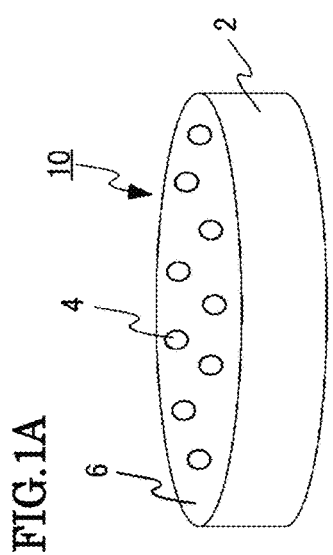
Figure 1C:
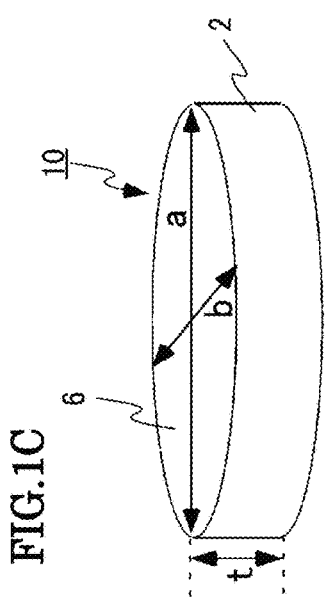

FIGS. 1A to 1D are schematic diagrams of flaky magnetic metal particles of the present embodiment. FIG. 1A is a schematic perspective view diagram of a flaky magnetic metal particle of the present embodiment. FIG. 1B is a schematic diagram of a flaky magnetic metal particle of the present embodiment when viewed from above. FIG. 1C is a schematic diagram illustrating the maximum length a, minimum length b, and thickness t of the flat surface of the present embodiment. FIG. 1D is a schematic diagram illustrating the case in which small magnetic metal particles are arranged in one direction on the flaky magnetic metal particle of the present embodiment.

Figure 2B:
FIGS. 2A and 2B are microscopic photographs of flaky magnetic metal particles of the first embodiment.
Figure 2A:
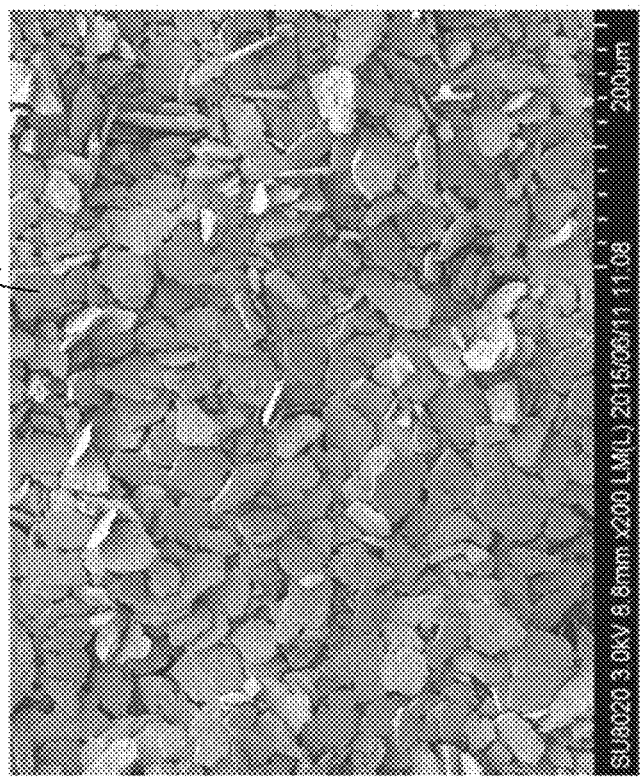

FIG. 2A and FIG. 2B are exemplary microscopic photographs of the flaky magnetic metal particles of the present embodiment. Small magnetic metal particles 4 are shown at the tips of the arrows in FIG. 2B.

The flaky magnetic metal particles 10 include a plurality of magnetic metal particles 2 and a plurality of small magnetic metal particles 4. The flaky magnetic metal particles 10 are flaky particles or flattened particles having a flaky shape or a flattened shape. Here, the magnetic metal particle is an example of a first magnetic particle, and the small magnetic metal particle is an example of a second magnetic particle.

The magnetic metal particles 2 have a flat surface 6 and contain at least one first element selected from the group consisting of Fe (iron), Co (cobalt) and Ni (nickel).

The ratio a/b of the maximum length a with respect to the minimum length b in the flat surface 6 is between 1 and 5 inclusive on the average. As a result, when the particles are converted to a pressed powder, the particles are difficult to be bent, and the stress on the particles is likely to be reduced. That is, strain is reduced, and coercivity and the hysteresis loss are reduced. Also, since stress is reduced, thermal stability or mechanical characteristics such as strength and toughness can be easily enhanced.

The maximum length a and the minimum length b are determined as follows. The flat surface 6 is observed by transmission electron microscopy (TEM) or is observed by scanning electron microscopy (SEM), a line is drawn in a direction perpendicular to a tangent line at each point on the contour line of the flat surface 6, and the length from the line to a point intersecting the contour line on the opposite side is measured. This is performed for all points on the contour line, and the maximum lengths a and the minimum lengths b are determined.

It is desirable that the contour of the flat surface 6 is slightly round. As an extreme example, it is desirable to employ a round contour such as a circle or an ellipse, rather than a square or rectangular contour. As a result, stress is not easily concentrated in the vicinity of the contour, magnetic distortion of the flaky magnetic metal particles is reduced, coercivity is decreased, and the hysteresis loss is reduced, which is desirable. Since stress concentration is reduced, thermal stability or mechanical characteristics such as strength and toughness are also easily enhanced, and thus it is desirable.

The average thickness t of the magnetic metal particles 2 is between 10 nm and 100 μm inclusive. The average thickness t is more preferably between 10 nm and 1 μm inclusive, and even more preferably between 10 nm and 100 nm inclusive. Then, when a magnetic field is applied in a direction parallel to the flat surface, the eddy current loss can be made sufficiently small, and thus it is preferable. Furthermore, a smaller thickness is preferred because the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity is decreased, and the hysteresis loss can be reduced thereby, which is preferable.

The average thickness t is determined by making an observation of the magnetic metal particles 2 by TEM or SEM.

The average aspect ratio $(((a+b)/2)/t)$ of the magnetic metal particles 2 is between 5 and 10000 inclusive. It is because magnetic permeability becomes larger as the result. It is also because the ferromagnetic resonance frequency can be increased, and therefore, the ferromagnetic resonance loss can be made small. Furthermore, when the aspect ratio is high, the magnetic moment is confined in a direction parallel to the flat surface, and magnetization is likely to proceed by rotation magnetization, which is preferable. In a case in which magnetization proceeds by rotation magnetization, since magnetization is likely to proceed reversibly, coercivity is decreased, and the hysteresis loss can be reduced thereby, which is preferable.

The average aspect ratio $(((a+b)/2)/t)$ is determined by making an observation of the magnetic metal particles 2 by TEM or SEM.

The small magnetic metal particles 4 are disposed on the flat surface 6 at a rate of 5 or more particles per surface on the average.

The small magnetic metal particles 4 are disposed at the flat surface 6. Alternatively, the small magnetic metal particles 4 are provided on the surface of the flat surface 6. Alternatively, the small magnetic metal particles 4 are disposed at the surface of the flat surface 6. Alternatively, the small magnetic metal particles 4 are disposed on the surface of the flat surface 6. Alternatively, the small magnetic metal particles 4 are disposed on the flat surface 6. Alternatively, the small magnetic metal particles 4 are integrated with the flat surface 6.

The small magnetic metal particles 4 contain at least one first element selected from the group consisting of Fe, Co and Ni, and the average particle size is between 10 nm and 1 μm inclusive. More preferably, the small magnetic metal particles 4 have a composition equivalent to that of the magnetic metal particles 2. When the small magnetic metal particles 4 are provided at the surface of the flat surface 6, or the small magnetic metal particles 4 are integrated with the magnetic metal particles 2, the surface of the flaky magnetic metal particles 10 gets rough artificially, and as a result, the adhesiveness exhibited when the flaky magnetic metal particles 10 are converted to a pressed powder together with the interposed phase 20 that will be described below is significantly enhanced. As a result, thermal stability or mechanical characteristics such as strength and toughness are easily enhanced. In order to obtain such an effect to the maximal extent, it is desirable to adjust the average particle size of the small magnetic metal particles 4 to be between 10 nm and 1 μm inclusive, and to integrate 5 or more on the average of the small magnetic metal particles 4 with the surface of the flaky magnetic metal particles 10, that is, the flat surface 6. Furthermore, as in FIG. 1D, when the small magnetic metal particles 4 are arranged in one direction in the flat surface 6, magnetic anisotropy is likely to be imparted within the flat surface 6, and high magnetic permeability and low losses can be easily realized. Therefore, it is more preferable.

The average particle size of the small magnetic metal particles 4 is determined by making an observation of the small magnetic metal particles 4 by TEM or SEM.

The flaky magnetic metal particles 10 and the small magnetic metal particles 4 include Fe and Co, and the amount of Co is preferably between 10 atom % and 60 atom % inclusive relative to the total amount of Fe and Co, and it is more preferable that Co is included at a proportion of between 10 atom % and 40 atom % inclusive. As a result, an appropriately high magnetic anisotropy is likely to be imparted, and the magnetic characteristics described above are enhanced, which is thus preferable. Furthermore, a Fe—Co-based alloy is preferred because high saturation magnetization can be easily realized. Moreover, when the composition ranges of Fe and Co fall in the ranges described above, higher saturation magnetization can be realized, which is preferable.

It is desirable that the flaky magnetic metal particles 10 have magnetic anisotropy in one direction within each of the flat surfaces 6, and this will be explained in detail. First, in a case in which the magnetic domain structure of the flaky magnetic metal particles 10 is a multi-domain structure, the magnetization process proceeds by domain wall displacement; however, in this case, coercivity in the easy axis direction within the flat surface 6 becomes smaller than that in the hard axis direction, and a loss (hysteresis loss) is decreased. Furthermore, magnetic permeability in the easy axis direction becomes higher than that in the hard axis direction. Furthermore, compared to the case of flaky magnetic metal particles 10 that are isotropic, particularly the coercivity in the easy axis direction is lower in the case of flaky magnetic metal particles 10 having magnetic anisotropy, and as a result, losses become smaller, which is preferable. Also, magnetic permeability becomes high, and it is preferable. That is, when the flaky magnetic metal particles have magnetic anisotropy within the flat surface 6, magnetic characteristics are enhanced as compared to an isotropic material. Particularly, magnetic characteristics are superior in the easy axis direction within the flat surface 6 than in the hard axis direction, which is preferable. Next, in a case in which the magnetic domain structure of the flaky magnetic metal particles 10 is a single domain structure, the magnetization process proceeds by rotation magnetization; however, in this case, coercivity in the hard axis direction within the flat surface 6 becomes smaller than that in the easy axis direction, and losses are decreased. In a case in which magnetization proceeds completely by rotation magnetization, coercivity becomes zero, and the hysteresis loss becomes zero, which is preferable. Furthermore, whether magnetization proceeds by domain wall displacement (domain wall displacement type) or by rotation magnetization (rotation magnetization type) is determined by whether the magnetic domain structure becomes a multi-domain structure or a single domain structure. At this time, whether the magnetic domain structure is a multi-domain structure or a single domain structure is determined by the size (thickness or aspect ratio) of the flaky magnetic metal particles 10, composition, magnetic interaction between particles, and the like. For example, as the thickness t of the flaky magnetic metal particles 10 is smaller, the magnetic domain structure is more likely to become a single domain structure. When the thickness is between 10 nm and 1 μm inclusive, particularly between 10 nm and 100 nm inclusive, the magnetic domain structure easily becomes a single domain structure. In regard to the composition, for a composition having high crystal magnetic anisotropy, even if the thickness is large, a single domain structure is easily maintained. For a composition having low crystal magnetic anisotropy, if the thickness is not small, it tends to be difficult to maintain a single domain structure. That is, the thickness of the boundary line between whether the magnetic domain structure becomes a single domain structure and whether the magnetic domain structure becomes a multi-domain structure is also changed by the composition. Furthermore, when the flaky magnetic metal particles 10 magnetically interact, and the magnetic domain structure is stabilized, the magnetic domain structure easily becomes a single domain structure. Furthermore, the determination of whether the magnetization behavior is of the domain wall displacement type or the rotation magnetization type can be made simply as follows. First, within a plane of a soft magnetic material (a plane that is parallel to the flat surface of a flaky magnetic metal particle), magnetization is analyzed by varying the direction in which a magnetic field is applied, and two directions in which the difference in the magnetization curve becomes the largest (at this time, the two directions are directions tilted by 90° from each other) are found out. Next, a comparison is made between the curves of the two directions, and thereby it can be determined whether the magnetization behavior is of the domain wall displacement type or the rotation magnetization type.

The magnitude of uniaxial magnetic anisotropy within this flat surface 6 is preferably between 0.1 Oe and 10 kOe inclusive, more preferably between 1.0 Oe and 1 kOe inclusive, and even more preferably between 1 Oe and 100 Oe inclusive. Furthermore, whether the flaky magnetic metal particles have magnetic anisotropy, or to what extent the flaky magnetic metal particles have magnetic anisotropy, can be simply evaluated by analyzing the anisotropy by varying the direction using, for example, a vibrating sample magnetometer (VSM). A pressed powder obtained using conventional flaky particles is magnetically isotropic within a flat surface, and therefore, such a pressed powder is fundamentally different from the pressed powder of the present embodiment. When a pressed powder has magnetic anisotropy with a flat surface, magnetic characteristics are significantly enhanced.

The variation of the particle size distribution of a plurality of flaky magnetic metal particles 10 can be defined by the coefficient of variation (CV value). That is, CV value (%)=[standard deviation (μm) of particle size distribution/average particle size (μm)]×100. It can be said that as the CV value is smaller, a sharp particle size distribution having a small variation of the particle size distribution is obtained. When the CV value defined as described above is between 0.1% and 60% inclusive, low coercivity, low hysteresis loss, high magnetic permeability, and high thermal stability can be realized, and thus it is preferable. Furthermore, since the variation is small, a high yield can be easily realized. A more preferred range of the CV value is between 0.1% and 40% inclusive.

In order to induce magnetic anisotropy, a method of making the flaky magnetic metal particles amorphous as far as possible, and thereby inducing magnetic anisotropy in one direction in plane by means of a magnetic field or strain, may be employed. In this case, it is desirable that the flaky magnetic metal particles adopt a composition that can make the particles amorphous as far as possible. From this point of view, it is preferable that the magnetic metal included in the flaky magnetic metal particles includes at least one additive element selected from B (boron), Si (silicon), C (carbon), Ti (titanium), Zr (zirconium), Hf (hafnium), Nb (niobium), Ta (tantalum), Mo (molybdenum), Cr (chromium), Cu (copper), W (tungsten), P (phosphorus), N (nitrogen) and Ga (gallium), at a proportion of between 0.001 atom % and 25 atom % in total relative to the total amount of the first element and the additive element.

It is preferable that the flaky magnetic metal particles 10 include Fe and Co and have portions having a crystal structure of a body-centered cubic (bcc) structure. As a result, an appropriately high magnetic anisotropy is likely to be imparted, and the magnetic characteristics described above are enhanced, which is preferable.

It is preferable that the flat surface 6 are crystallographically oriented. The direction of orientation is preferably the (110) plane orientation or the (111) plane orientation, and more preferably the (110) plane orientation. In a case in which the crystal structure of the flaky magnetic metal particles 10 is a body-centered cubic (bcc) structure, the (110) plane orientation is preferred, and in a case in which the crystal structure of the flaky magnetic metal particles 10 is a face-centered cubic (fcc) structure, the (111) plane orientation is preferred. As a result, magnetic anisotropy tends to be imparted appropriately, and the magnetic characteristics described above are enhanced, which is preferable.

Furthermore, regarding more preferred directions of orientation, the (110) [111] direction and the (111) [110] direction are preferred, and the (110) [111] direction is more preferred. In a case in which the crystal structure of the flaky magnetic metal particles 10 is a body-centered cubic (bcc) structure, orientation in the (110) [111] direction is preferred, and in a case in which the crystal structure of the flaky magnetic metal particles 10 is a face-centered cubic (fcc) structure, orientation in the (111) [110] direction is preferred. As a result, magnetic anisotropy tends to be imparted appropriately, and the magnetic characteristics described above are enhanced, which is preferable. Furthermore, according to the present specification, the "(110) [111] direction" means that the slip plane is the (110) plane or a plane that is crystallographically equivalent to the (110) plane, that is, the {110} plane, and the slip direction is the [111] direction or a direction that is crystallographically equivalent to the [111] direction, that is, the <111> direction. The same also applies to the (111) [110] direction. That is, the (111) [110] direction means that the slip plane is the (111) plane or a plane that is crystallographically equivalent to the (111) plane, that is, the {111} plane, and the slip direction is the [110] direction or a direction that is crystallographically equivalent to the [110] direction, that is, the <110> direction.

The lattice strain of the magnetic metal phase of the flaky magnetic metal particles 10 is preferably between 0.01% and 10% inclusive, more preferably between 0.01% and 5% inclusive, even more preferably between 0.01% and 1% inclusive, and still more preferably between 0.01% and 0.5% inclusive. As a result, an appropriately high magnetic anisotropy is likely to be imparted, and the magnetic characteristics described above are enhanced, which is preferable.

The lattice strain can be calculated by analyzing in detail the line width obtainable by an X-ray diffraction (XRD) method. That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, reference may be made to, for example, N. C. Halder, C. N. J. Wagner, Acta Cryst., 20 (1966) 312-313. Here, a Halder-Wagner plot is represented by the following expression:

$$\frac{\beta^2}{\tan^2\theta} = \frac{K\lambda}{D}\frac{\beta}{\tan\theta\sin\theta} + 16\varepsilon^2, \quad \text{[Mathematical Formula 1]}$$

$$\varepsilon = \varepsilon_{max} = \frac{\sqrt{2\pi}}{2}\sqrt{\overline{\varepsilon^2}}$$

(β: width of integration, K: constant, λ: wavelength, D: crystal grain size, $\sqrt{\overline{\varepsilon^2}}$ crystal strain (root mean square))

That is, $\beta^2/\tan^2\theta$ is plotted on the vertical axis, and $\beta/\tan\theta\sin\theta$ is plotted on the horizontal axis. The crystal grain size D is calculated from the gradient of the approximation straight line of the plot, and the lattice strain ε is calculated from the ordinate intercept. When the lattice strain obtained by the Halder-Wagner plot of the expression described above (lattice strain (root-mean-square)) is between 0.01% and 10% inclusive, more preferably between 0.01% and 5% inclusive, even more preferably between 0.01% and 1% inclusive, and still more preferably between 0.01% and 0.5% inclusive, magnetic anisotropy tends to be imparted to an appropriately significant extent, and the magnetic characteristics described above are enhanced, which is preferable.

The lattice strain analysis described above is a technique that is effective in a case in which a plurality of peaks can be detected by XRD; however, in a case in which the peak intensities in XRD are weak, and there are few peaks that can be detected (for example, in a case in which only one peak is detected), it is difficult to perform an analysis. In such a case, it is preferable to calculate the lattice strain by the following procedure. First, the composition is determined by an inductively coupled plasma (ICP) emission analysis, energy dispersive X-ray spectroscopy (EDX), or the like, and the composition ratio of the three magnetic metal elements, namely, Fe, Co and Ni, is calculated (in a case in which there are only two magnetic metal elements, the composition ratio of the two). In a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy of the composition is synthesized, and the lattice spacing is calculated by making a measurement). Subsequently, the amount of strain can be determined by determining the difference between the lattice spacing d of the peaks of an analyzed sample and the ideal lattice spacing $d_0$. That is, in this case, the amount of strain is calculated by the expression: $(d-d_0)/d_0 \times 100(\%)$. Thus, in regard to the analysis of the lattice strain, it is preferable to use the two above-described techniques appropriately depending on the state of peak intensity, and depending on cases, it is preferable to evaluate the amount of strain by using the two techniques in combination.

The lattice spacing in the flat surface 6 varies with direction, and the proportion of the difference between the maximum lattice spacing $d_{max}$ and the minimum lattice spacing $d_{min} (=(d_{max}-d_{min})/d_{min} \times 100(\%))$ is preferably between 0.01% and 10% inclusive, more preferably between 0.01% to 5% inclusive, even more preferably between 0.01% and 1% inclusive, and still more preferably between 0.01% and 0.5% inclusive. As a result, magnetic anisotropy tends to be imparted appropriately, and the magnetic characteristics described above are enhanced, which is preferable. Furthermore, the lattice spacing can be determined simply by an XRD analysis. When this XRD analysis is carried out while varying the direction within a plane, the difference of lattice constants in accordance with the direction can be determined.

In regard to the crystallites of the flaky magnetic metal particles 10, it is preferable that either the crystallites are unidirectionally linked in a row within the flat surface 6, or the crystallites are rod-shaped and are unidirectionally oriented within the flat surface 6. As a result, an appropriately high magnetic anisotropy is likely to be imparted, and the magnetic characteristics described above are enhanced, which is preferable.

Next, the method for producing the flaky magnetic metal particles 10 of the present embodiment will be described.

According to the method for producing the flaky magnetic metal particles of the present embodiment, a magnetic metal ribbon containing at least one first element selected from the group consisting of Fe, Co and Ni is produced, the magnetic metal ribbon is heat-treated at a temperature between 50° C. and 800° C. inclusive, and the heat-treated magnetic metal ribbon is pulverized while being cooled to 0° C. or lower. Thus, flaky magnetic metal particles are produced.

Hereinafter, the production method will be explained specifically. The production method is not particularly limited, and the production method will be explained only for illustrative purposes.

A first step is a step of producing a magnetic metal ribbon containing at least one first element selected from the group consisting of Fe, Co and Ni. The present step is a step of producing a ribbon or a thin film using, for example, a film-forming apparatus such as a single roll cooling apparatus or a sputtering apparatus. At this time, in regard to the film-forming method of producing a film using a film-forming apparatus, it is desirable to produce a film that is imparted with uniaxial anisotropy within the film plane, through film formation in a magnetic field, rotational film formation or the like. Furthermore, in the case of using a film-forming apparatus, the thickness can be made small, the structure may be easily refined, and rotation magnetization can easily occur. Therefore, in the case of producing a rotation magnetization type film, it is desirable to use a film-forming method.

A second step is a step of heat-treating the magnetic metal ribbon at a temperature between 50° C. and 800° C. inclusive. In the present step, the ribbon is cut into an appropriate size in order to make it easy to introduce the ribbon into an electric furnace for heat treatment. For example, the ribbon is cut into an appropriate size using a mixing apparatus or the like. As a result of performing the present step, pulverizability is likely to be enhanced in the pulverization step, which is the subsequent third step, and thus it is desirable. The atmosphere for the heat treatment is preferably a vacuum atmosphere at a low oxygen concentration, an inert atmosphere, or a reducing atmosphere, and more preferably, a reducing atmosphere of $H_2$ (hydrogen), CO (carbon monoxide), $CH_4$ (methane) or the like is preferred. The reason for this is that even if the magnetic metal ribbon has been oxidized, the oxidized metal can be reduced into metal by performing a heat treatment in a reduced atmosphere. As a result, a magnetic metal ribbon that has been oxidized and have lowered saturation magnetization can be reduced, and thereby saturation magnetization can be restored. When crystallization of the magnetic metal ribbon proceeds noticeably due to the heat treatment, characteristics are deteriorated (coercivity increases, and magnetic permeability decreases). Therefore, it is preferable to select the conditions so as to suppress excessive crystallization. Furthermore, more preferably, it is more desirable to perform the heat treatment in a magnetic field. It is more preferable if the magnetic field to be applied is larger; however, it is preferable to apply a magnetic field of 1 kOe or greater, and it is more preferable to apply a magnetic field of 10 kOe or greater. As a result, magnetic anisotropy can be induced within the plane of the magnetic metal ribbon, and excellent magnetic characteristics can be realized, which is preferable.

A third step is a step of producing flaky magnetic metal particles 10 by pulverizing the heat-treated magnetic metal ribbon while cooling the magnetic metal ribbon to 0° C. or lower. In the present step, the magnetic metal ribbon or thin film may be cut into an appropriate size using a mixing apparatus or the like, before the main pulverization. In the present step, pulverization is performed using, for example, a pulverizing apparatus such as a bead mill or a planetary mill. Regarding the pulverizing apparatus, there is no particular selection for the type. Examples include a planetary mill, a bead mill, a rotating ball mill, a vibrating ball mill, an agitating ball mill (attritor), a jet mill, a centrifuge, or techniques combining milling and centrifugation. On the occasion of pulverization, pulverization is performed while the material is cooled to a temperature of 0° C. or lower. Particularly, it is desirable to cool the material at the liquid nitrogen temperature (77 K), the dry ice temperature (194 K) or the like, and above all, it is more desirable to cool the material to the liquid nitrogen temperature. As a result, the magnetic metal ribbon is likely to induce low temperature brittleness, and pulverization can be carried out easily. That is, pulverization can be carried out efficiently without subjecting the magnetic metal ribbon to excessive stress or strain, and therefore, it is preferable.

In the third step, the thickness of the flaky magnetic metal particles 10 can be made small by not simply performing pulverization but combining pulverization with rolling. Here, rolling may be performed simultaneously, or rolling may be performed after pulverization, or pulverization may be performed after rolling. In this case, an apparatus capable of applying a strong gravitational acceleration is preferred, and the process can be performed using, for example, a planetary mill, a bead mill, a rotating ball mill, a vibrating ball mill, an agitating ball mill (attritor), a jet mill, a centrifuge, or a technique combining milling and centrifugation. For example, a high-power planetary mill apparatus is preferable because a gravitational acceleration of several ten G can be applied easily. In the case of a high-power planetary mill apparatus, an inclined type planetary mill apparatus is more preferred, in which the direction of rotational gravitational acceleration and the direction of revolutionary gravitational acceleration are not directions on the same straight line, but are directions that form an angle. In a conventional planetary mill apparatus, the direction of rotational gravitational acceleration and the direction of revolutionary gravitational acceleration are on the same straight line; however, in an inclined type planetary mill apparatus, since the vessel performs a rotating movement in an inclined state, the direction of rotational gravitational acceleration and the direction of revolutionary gravitational acceleration are not on the same straight line, but form an angle. As a result, power is efficiently transferred to the sample, and pulverization and rolling is carried with high efficiency, which is preferable. Furthermore, in consideration of mass productivity, a bead mill apparatus that facilitates treatment in large quantities is preferred.

It is desirable to perform a treatment so as to obtain flaky magnetic metal particles 10 having a predetermined thickness and a predetermined aspect ratio, by performing cutting, pulverization and rolling as described above, and optionally repeating cutting, pulverization and rolling. At this time, when pulverization and rolling are performed so as to obtain a thickness of between 10 nm and 100 μm inclusive, more preferably between 10 nm and 1 μm inclusive, and even more preferably between 10 nm and 100 nm inclusive, particles that can easily undergo rotation magnetization are obtained, which is preferable.

Furthermore, for the flaky magnetic metal particles 10 thus obtained, it is desirable to remove the lattice strain as appropriate through a heat treatment. The heat treatment at this time is preferably performed at a temperature of between 50° C. and 800° C. inclusive, as in the case of the second step, and the atmosphere for the heat treatment is preferably a vacuum atmosphere at a low oxygen concentration, an inert atmosphere, or a reducing atmosphere, and more preferably a reducing atmosphere of $H_2$, CO, $CH_4$ or the like. Furthermore, more preferably, it is more desirable to perform the heat treatment in a magnetic field. The reasons or details for this are the same as the reasons or details in the case of the second step, and therefore, further explanation will not be repeated here.

Figure 3B:
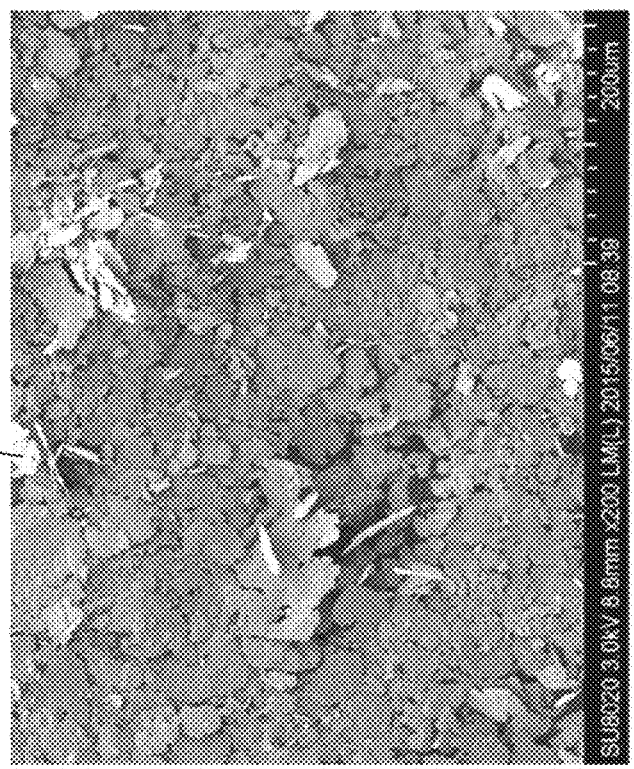
FIGS. 3A and 3B are microscopic photographs of flaky magnetic metal particles as a comparative material of the first embodiment.
Figure 3A:
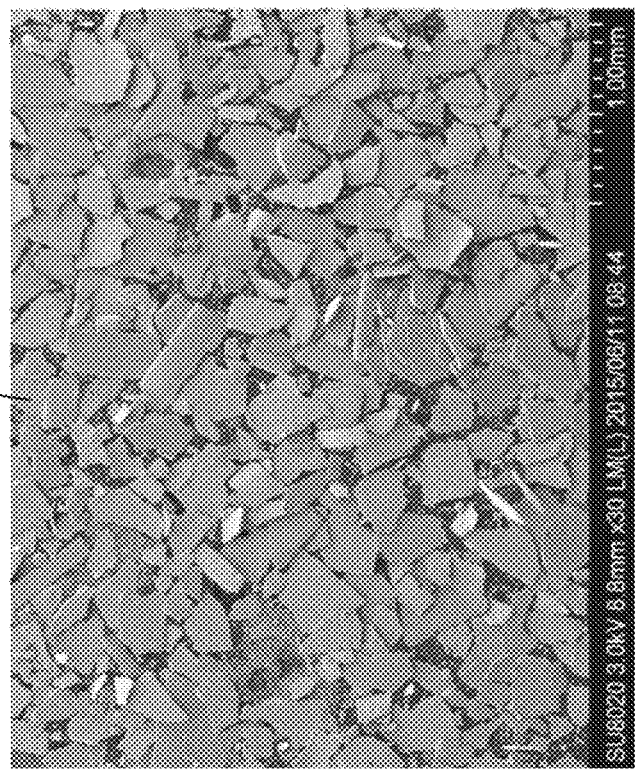

FIGS. 3A and 3B are microscopic photographs of flaky magnetic metal particles 80 as a comparative material of the present embodiment. FIG. 3A is a microscopic photograph of the flaky magnetic metal particles 80 that have been pulverized using a mixer and then sieved. When this technique is used alone, pulverization is difficult, and pulverization is achieved non-uniformly. Accordingly, in a large number of particles, the ratios of the maximum length to the minimum length in the flat surface are broadly distributed, and the CV value has a large distribution. FIG. 3B is a microscopic photograph of the flaky magnetic metal particles 80 that have been pulverized with a planetary mill and then sieved. Similarly to the case of FIG. 3A, when this technique is used alone, pulverization is difficult, and pulverization is achieved non-uniformly. Accordingly, in a large number of particles, the ratios of the maximum length to the minimum length in the flat surface are broadly distributed, and the CV value has a large distribution. Furthermore, compared to the case of FIG. 3A, there area larger number of flaky magnetic metal particles having distorted shapes.

FIG. 4A and FIG. 4B are microscopic photographs showing magnified views of the surfaces of the flaky magnetic metal particles 80 shown in FIG. 3A and FIG. 3B. The surfaces are smooth in both photographs, and any small magnetic metal particles being disposed on the surface are not observed.

FIGS. 5A to 5C are exemplary microscopic photographs showing differences in the flaky magnetic metal particles produced according to the present embodiment, the differences being caused by differences in the technique of pulverization. Meanwhile, for an easier comparison, the magnification ratios of FIG. 5A, FIG. 5B and FIG. 5C are all the same. FIG. 5A is a microscopic photograph of flaky magnetic metal particles 80 that have been pulverized with a mixer (first step) and then sieved. In this case, it is difficult to pulverize the flaky magnetic metal particles to a particle size of 250 μm or less. FIG. 5B is a microscopic photograph of flaky magnetic metal particles 80 that have been pulverized with a mixer (first step), and then pulverized while being cooled to the liquid nitrogen temperature (third step), without being subjected to a heat treatment. In this case, the flaky magnetic metal particles can be pulverized until the particle size reaches about 60 μm. FIG. 5C is a microscopic photograph of flaky magnetic metal particles 10 that have been pulverized with a mixer (first step), subjected to a heat treatment (second step), and then pulverized while being cooled to the liquid nitrogen temperature (third step). In this case, the flaky magnetic metal particles can be pulverized until the particle size reached about 30 μm.

Figures 6A, 6B:
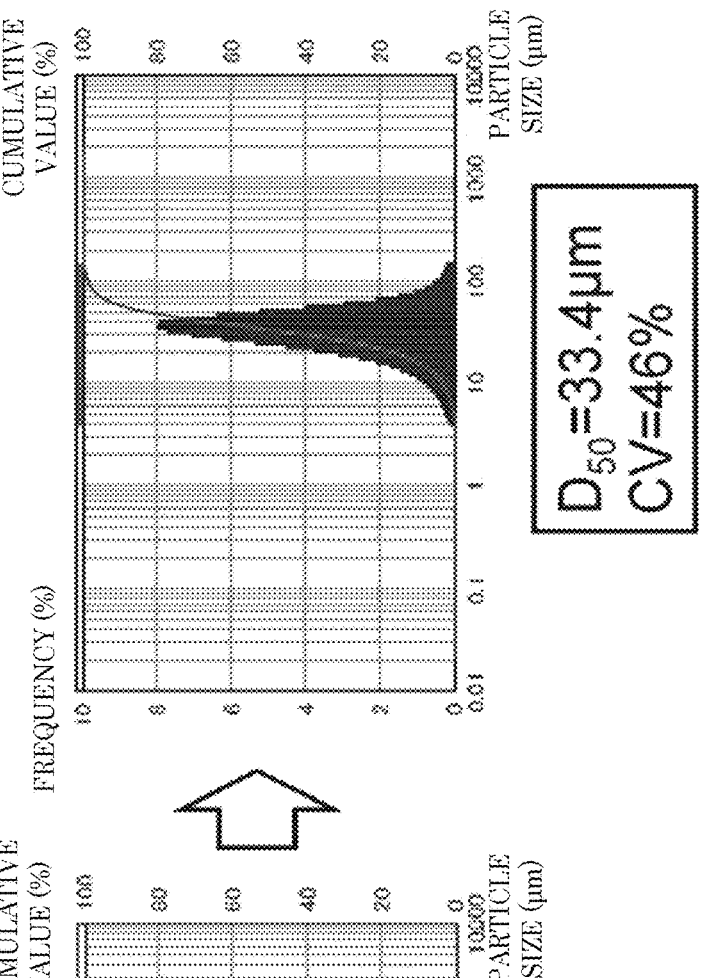
FIGS. 6A and 6B are diagrams illustrating the particle size distribution of the flaky magnetic metal particles of the first embodiment.

FIGS. 6A and 6B are diagrams illustrating exemplary particle size distributions of flaky magnetic metal particles. FIG. 6A is the particle size distribution of commercially available flaky magnetic metal particles 80 that have been pulverize with a planetary mill and then sieved. FIG. 6B is the particle size distribution of the flaky magnetic metal particles 10 of the present embodiment. When the flaky magnetic metal particles are pulverized using liquid nitrogen, even if sieving is not performed, flaky magnetic metal particles having a particle size distribution with a small CV value can be obtained. The CV value can be further decreased by sieving the flaky magnetic metal particles.

As described above, according to the present embodiment, flaky magnetic metal particles having high thermal stability and excellent mechanical characteristics can be provided.

(Second Embodiment)

Flaky magnetic metal particles of the present embodiment are different from the flaky magnetic metal particles of the first embodiment in that at least a portion of the surface of one of the flaky magnetic metal particles is covered with a coating layer having a thickness of between 0.1 nm and 1 μm inclusive and containing at least one secondary element selected from oxygen (O), carbon (C), nitrogen (N), and fluorine (F). Here, any matters overlapping with the content of the first embodiment will not be described repeatedly.

FIGS. 7A and 7B are schematic diagrams of the flaky magnetic metal particles 10 of the present embodiment.

A coating layer 14 contains at least one non-magnetic metal selected from the group consisting of magnesium (Mg), aluminum (Al), silicon (Si), calcium (Ca), zirconium (Zr), titanium (Ti), hafnium (Hf), zinc (Zn), manganese (Mn), barium (Ba), strontium (Sr), chromium (Cr), molybdenum (Mo), silver (Ag), gadolinium (Ga), scandium (Sc), vanadium (V), yttrium (Y), niobium (Nb), lead (Pb), copper (Cu), indium (In), tin (Sn), and rare earth elements, and it is more preferable that the coating layer 14 contains at least one secondary element selected from oxygen (O), carbon (C), nitrogen (N), and fluorine (F). The non-magnetic metal is particularly preferably Al or Si, from the viewpoint of thermal stability. In a case in which the flaky magnetic metal particles 10 contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn and rare earth elements, it is more preferable that the coating layer 14 contains at least one non-magnetic metal that is the same as the non-magnetic metal employed as one constituent component of the flaky magnetic metal particles 10. Among the oxygen (O), carbon (C), nitrogen (N) and fluorine (F), it is preferable that the coating layer contains oxygen (O), and an oxide or a composite oxide is preferred. This is because of the ease of formation, oxidation resistance, and thermal stability of the coating layer 14. As a result, the adhesiveness of the coating layer 14 to the flaky magnetic metal particles 10 can be increased, and the thermal stability and oxidation resistance of the pressed powder material that will be described below can be enhanced. The coating layer 14 can enhance the thermal stability or oxidation resistance of the flaky magnetic metal particles 10, and can also increase the electrical resistance of the flaky magnetic metal particles 10. By increasing electrical resistance, the eddy current loss can be suppressed, and the frequency characteristics of the magnetic permeability can be enhanced. Therefore, it is preferable that the coating layer 14 is electrically highly resistant, and the coating layer 14 preferably has a resistance value of, for example, 1 mΩ·cm or larger.

Furthermore, the presence of the coating layer 14 is also preferable from the viewpoint of magnetic characteristics. In regard to the flaky magnetic metal particles 10, since the dimension of the thickness is smaller than the dimension of the flat surface 6, the metal particles may be regarded as a pseudo thin film. At this time, a product obtained by forming the coating layer 14 on the surface of the flaky magnetic metal particles 10 and integrating the coating layer with the particles, can be considered to have a pseudo laminated thin film structure, and the magnetic domain structure is stabilized in terms of energy. As a result, coercivity can be reduced (consequently, the hysteresis loss is reduced), which is preferable. At this time, the magnetic permeability also becomes high, and it is preferable. From such a viewpoint, it is more preferable that the coating layer 14 is non-magnetic (magnetic domain structure is easily stabilized).

From the viewpoints of thermal stability, oxidation resistance, and electrical resistance, it is more preferable if the thickness of the coating layer 14 is larger. However, if the thickness of the coating layer is too large, the saturation magnetization becomes small, and the magnetic permeability also becomes small, which is not preferable. Furthermore, even from the viewpoint of magnetic characteristics, if the thickness is too large, the "effect by which the magnetic domain structure is stabilized, and a decrease in coercivity, a decrease in losses, and an increase in magnetic permeability are brought about" is reduced. In consideration of the above-described matters, a preferred thickness of the coating layer is between 0.1 nm and 1 μm inclusive, and more preferably between 0.1 nm and 100 nm inclusive.

The small magnetic metal particles 4 may be provided between coating layers, as shown in FIG. 7A. Furthermore, the small magnetic metal particles 4 may be provided in the interior of the coating layer 14, as shown in FIG. 7B, or a portion thereof may be provided on the outside of the coating layer 14.

Thus, according to the present embodiment, flaky magnetic metal particles having high thermal stability and excellent mechanical characteristics can be provided.

(Third Embodiment)

A pressed powder material of the present embodiment includes a plurality of flaky magnetic metal particles as described in the first or second embodiment, and an interposed phase existing between the flaky magnetic metal particles and containing at least one secondary element. Here, any matters overlapping with the contents of the first or second embodiment will not be described repeatedly.

Figure 8:
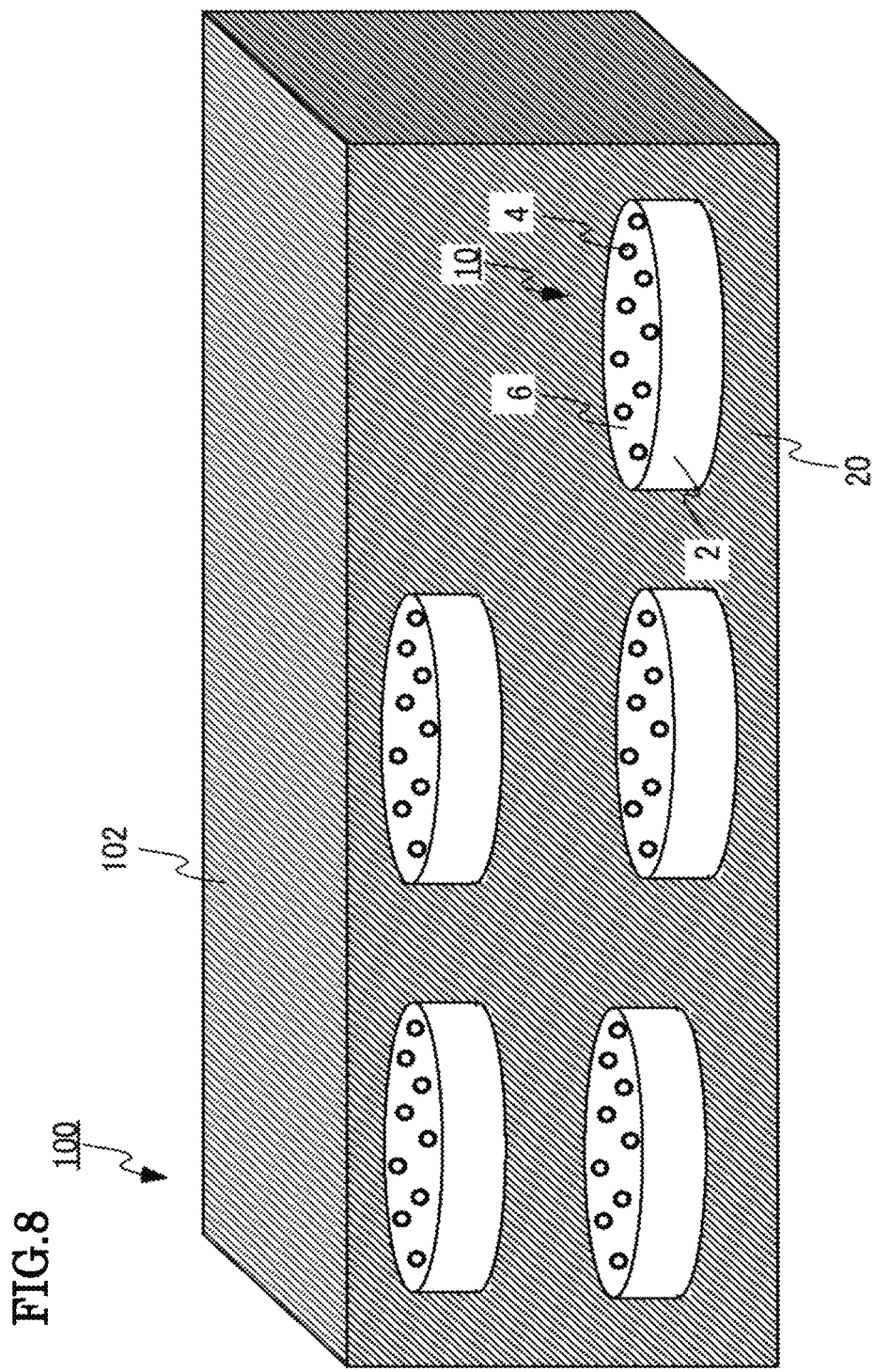
FIG. 8 is a schematic diagram of a pressed powder material of a third embodiment.

FIG. 8 is a schematic diagram of a pressed powder material 100 of the present embodiment.

The interposed phase 20 contains at least one secondary element selected from oxygen (O), carbon (C), nitrogen (N), and fluorine (F). This is because electrical resistance can be increased thereby. It is preferable that the electrical resistivity of the interposed phase 20 is higher than the electrical resistivity of the flaky magnetic metal particles 10. It is because the eddy current loss of the flaky magnetic metal particles 10 can be reduced thereby. Since the interposed phase 20 exists in a state of being surrounded by the flaky magnetic metal particles 10, oxidation resistance and thermal stability of the flaky magnetic metal particles 10 can be enhanced, which is preferable. Among these, it is more preferable that the interposed phase 20 contains oxygen, from the viewpoints of high oxidation resistance and high thermal stability. Since the interposed phase 20 also plays a role of mechanically attaching the flaky magnetic metal particles 10, it is also preferable from the viewpoint of high strength.

Furthermore, it is preferable that the interposed phase 20 is included in an amount of between 0.01 wt % and 80 wt % inclusive, more preferably between 0.1 wt % and 60 wt % inclusive, and even more preferably between 0.1 wt % and 40 wt % inclusive, relative to the total amount of the pressed powder material 100. If the proportion of the interposed phase 20 is too large, the proportion of the flaky magnetic metal particles 10 that are responsible for magnetism becomes small, and as a result, the saturation magnetization or the magnetic permeability of the pressed powder material 100 is decreased, which is not preferable. On the contrary, if the proportion of the interposed phase 20 is too small, adhesiveness between the flaky magnetic metal particles 10 and the interposed phase 20 becomes weak, and this is not preferable from the viewpoint of thermal stability or mechanical characteristics such as strength and toughness. The proportion of the interposed phase 20 that is optimal from the viewpoints of magnetic characteristics such as saturation magnetization and magnetic permeability, thermal stability and mechanical characteristics, is between 0.01 wt % and 80 wt % inclusive, more preferably between 0.1 wt % and 60 wt % inclusive, and even more preferably between 0.1 wt % and 40 wt % inclusive, relative to the total amount of the pressed powder material 100.

Furthermore, it is preferable that the lattice mismatch proportion between the interposed phase 20 and the flaky magnetic metal particles 10 is between 0.1% and 50% inclusive. As a result, magnetic anisotropy tends to be imparted appropriately, and the magnetic characteristics described above are enhanced, which is preferable. In order to set the lattice mismatch to the range described above, the desired lattice mismatch can be realized by selecting a combination of the composition of the interposed phase and the composition of the flaky magnetic metal particles 10. For example, Ni of an fcc structure has a lattice constant of 3.52 Å, and MgO of a NaCl type structure has a lattice constant of 4.21 Å. Thus, the lattice mismatch between the two is (4.21−3.52)/3.52×100=20%. That is, when the main composition of the flaky magnetic metal particles 10 includes Ni of the fcc structure, and the main composition of the interposed phase 20 includes MgO, the lattice mismatch can be set to 20%. As such, the lattice mismatch can be set to the range described above, by selecting the combination of the main composition of the flaky magnetic metal particles 10 and the main composition of the interposed phase 20.

Furthermore, the interposed phase 20 satisfies at least one of the following three conditions: being an eutectic oxide, containing a resin, and containing at least one magnetic metal selected from Fe, Co and Ni. In this regard, explanations will be given below.

First, the first case in which the interposed phase 20 is an eutectic oxide will be explained. In this case, the interposed phase 20 contains an eutectic oxide containing at least two third elements selected from the group consisting of B (boron), Si (silicon), Cr (chromium), Mo (molybdenum), Nb (niobium), Li (lithium), Ba (barium), Zn (zinc), La (lanthanum), P (phosphorus), Al (aluminum), Ge (germanium), W (tungsten), Na (sodium), Ti (titanium), As (arsenic), V (vanadium), Ca (calcium), Bi (bismuth), Pb (lead), Te (tellurium), and Sn (tin). Particularly, it is preferable that the interposed phase 20 contains an eutectic system containing at least two fourth elements selected from the group consisting of B, Bi, Si, Zn and Pb. As a result, the adhesiveness between the flaky magnetic metal particles and the interposed phase 20 becomes strong (adhesive strength increases), and the thermal stability or mechanical characteristics such as strength and toughness can be easily enhanced.

Furthermore, the eutectic oxide preferably has a softening point of between 200° C. and 600° C. inclusive, and more preferably between 400° C. and 500° C. inclusive. Even more preferably, the eutectic oxide is preferably an eutectic oxide containing at least two fourth elements among B, Bi, Si, Zn and Pb, and having a softening point of between 400° C. and 500° C. inclusive. As a result, the adhesiveness between the flaky magnetic metal particles 10 and the eutectic oxide becomes strong, and the thermal stability or mechanical characteristics such as strength and toughness are easily enhanced. When the flaky magnetic metal particles 10 are integrated with the eutectic oxide, the two components are integrated while performing a heat treatment at a temperature near the softening point of the eutectic oxide, and preferably a temperature slightly higher than the softening point. Then, the adhesiveness between the flaky magnetic metal particles 10 and the eutectic oxide is increased, and mechanical characteristics can be enhanced. Generally, as the temperature of the heat treatment is higher to a certain extent, the adhesiveness between the flaky magnetic metal particles 10 and the eutectic oxide is increased, and the mechanical characteristics are enhanced. However, if the temperature of the heat treatment is too high, the coefficient of thermal expansion may become large, and consequently, the adhesiveness between the flaky magnetic metal particles 10 and the eutectic oxide may be decreased on the contrary (if the difference between the coefficient of thermal expansion of the flaky magnetic metal particles 10 and the coefficient of thermal expansion of the eutectic oxide becomes large, the adhesiveness may be further decreased). Furthermore, in a case in which the crystallinity of the flaky magnetic metal particles 10 is non-crystalline or amorphous, if the temperature of the heat treatment is high, crystallization proceeds, and coercivity increases. Therefore, it is not preferable. For this reason, in order to achieve a balance between the mechanical characteristics and the coercivity characteristics, it is preferable to adjust the softening point of the eutectic oxide to be between 200° C. and 600° C. inclusive, and more preferably between 400° C. and 500° C. inclusive, and to integrate the flaky magnetic metal particles and the eutectic oxide while performing a heat treatment at a temperature near the softening point of the eutectic oxide, and preferably at a temperature slightly higher than the softening point. Furthermore, regarding the temperature at which the integrated material is actually used in a device or a system, it is preferable to use the integrated material at a temperature lower than the softening point.

Furthermore, it is preferable that the eutectic oxide has a glass transition temperature. Furthermore, it is desirable that the eutectic oxide has a coefficient of thermal expansion of between $0.5\times10^{-6}/°$ C. and $40\times10^{-6}/°$ C. inclusive. As a result, the adhesiveness between the flaky magnetic metal particles 10 and the eutectic oxide becomes strong, and the thermal stability or the mechanical characteristics such as strength and toughness may be easily enhanced.

Figure 9:
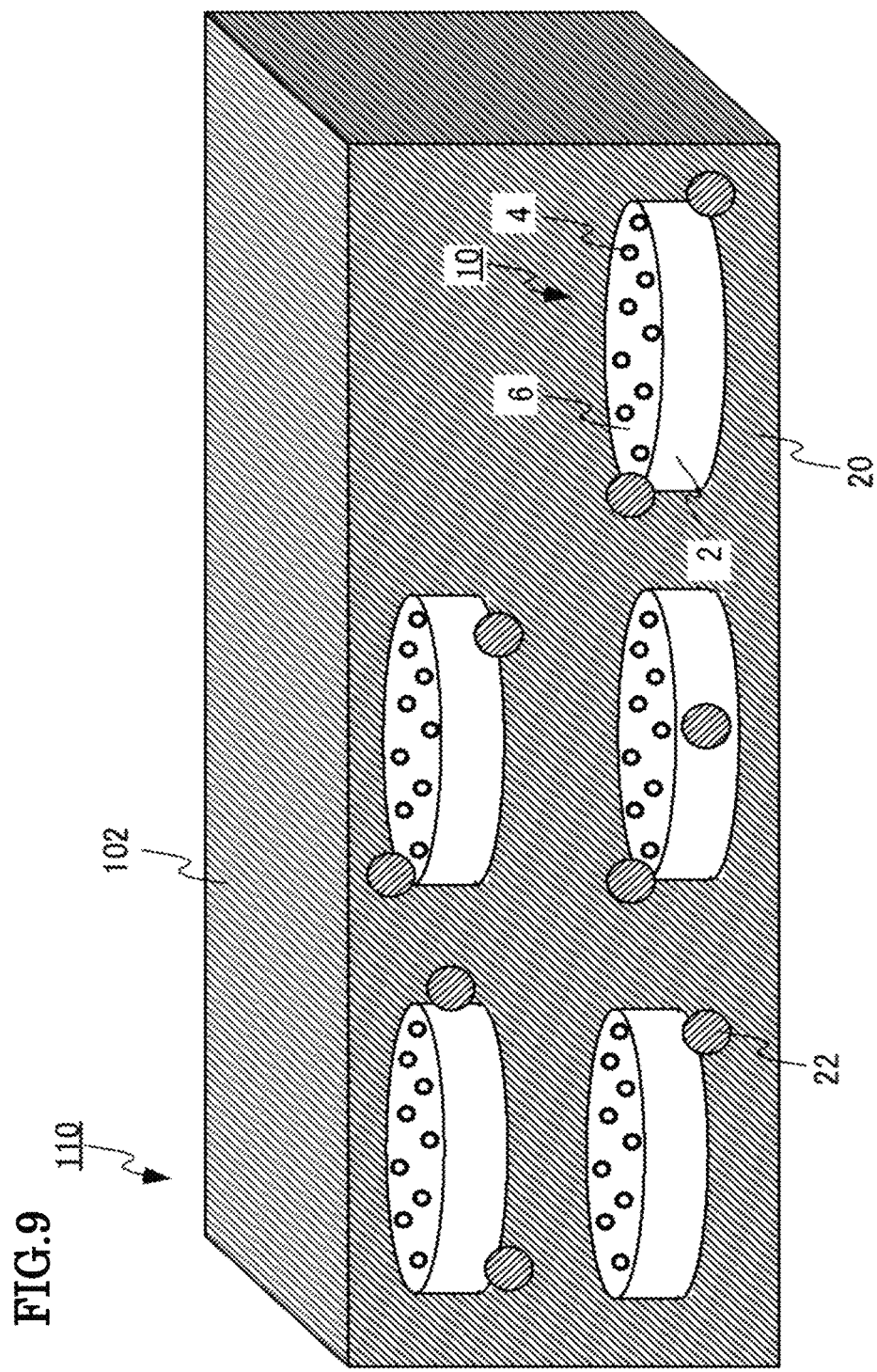
FIG. 9 is a schematic diagram of a pressed powder material of the third embodiment having eutectic particles.

Furthermore, it is more preferable that the eutectic oxide includes at least one or more eutectic particles 22 that are in a particulate form (preferably a spherical form) having a particle size of between 10 nm and 10 μm inclusive. These eutectic particles 22 contain the same material as the eutectic oxide that is not in a particulate form. In a pressed powder material, pores may also exist partially, and thus, it can be easily observed that a portion of the eutectic oxide exists in a particulate form, and preferably in a spherical form. Even in a case in which there are no pores, the interface of the particulate form or spherical form can be easily discriminated. The particle size of the eutectic particles 22 is more preferably between 10 nm and 1 μm inclusive, and even more preferably between 10 nm and 100 nm inclusive. Thereby when stress is appropriately relieved during the heat treatment while the adhesiveness between the flaky magnetic metal particles is retained, the strain applied to the flaky magnetic metal particles can be reduced, and coercivity can be reduced. As a result, the hysteresis loss is also reduced, and the magnetic permeability is increased. Meanwhile, the particle size of the eutectic particles 22 can be measured by an observation by TEM or SEM. FIG. 9 is a schematic diagram of the pressed powder material 110. In FIG. 9, the interposed phase 20 fills in the space without any pores; however, in reality, pores may exist partially.

Furthermore, it is preferable that the interposed phase 20 has a softening point that is higher than the softening point of the eutectic oxide, more preferably has a softening point that is higher than 600° C., and that the interposed phase 20 further contains intermediate interposed particles 24 containing at least one secondary element selected from the group consisting of O (oxygen), C (carbon), N (nitrogen) and F (fluorine). When the intermediate interposed particles 24 exist between the flaky magnetic metal particles 10, on the occasion in which the pressed powder material 150 is exposed to high temperature, the flaky magnetic metal particles 10 being prevented to be thermally combined with each other and the deterioration of the characteristics can be prevented. That is, it is desirable that the intermediate interposed particles 24 exist mainly for the purpose of thermal stability. Furthermore, the softening point of the intermediate interposed particles 24 is higher than the softening point of the eutectic oxide, and more preferably, when the softening point is 600° C. or higher, thermal stability can be further increased.

It is preferable that the intermediate interposed particles 24 contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements, and contain at least one secondary element selected from the group consisting of O (oxygen), C (carbon), N (nitrogen) and F (fluorine). More preferably, from the viewpoints of high oxidation resistance and high thermal stability, an oxide or composite oxide containing oxygen is more preferred. Particularly, oxides such as aluminum oxide ($Al_2O_3$) silicon dioxide ($SiO_2$), titanium oxide ($TiO_2$), and zirconium oxide ($ZrO_2$); and composite oxides such as Al—Si—O are preferred from the viewpoint of high oxidation resistance and high thermal stability.

FIGS. 10A and 10B show schematic diagrams of a pressed powder material 120 and a pressed powder material 130 containing intermediate interposed particles 24. FIGS. 10A and 10B show the case in which the interposed phase 20 does not contain eutectic particles 22 (FIG. 10A) and the case in which the interposed phase 20 contains the eutectic particles 22 (FIG. 10B). In FIGS. 10A and 10B, the interposed phase 20 fills in the space without any pores; however, the pores may exist partially.

Regarding the method for producing a pressed powder material 120 and the pressed powder material 130, both of which contain intermediate interposed particles 24, for example, a method of mixing the flaky magnetic metal particles and the intermediate interposed particles (aluminum oxide ($Al_2O_3$) particles, silicon dioxide ($SiO_2$) particles, titanium oxide ($TiO_2$) particles, zirconium oxide ($ZrO_2$) particles, and the like) into a dispersed state using a ball mill or the like, and then integrating the flaky magnetic metal particles and the intermediate interposed particles by press molding or the like, can be used. The method of dispersing the particles is not particularly limited as long as it is a method capable of appropriately dispersing particles.

Next, the second case in which the interposed phase 20 contains a resin will be explained. In this case, the resin is not particularly limited; however, a polyester-based resin, a polyethylene-based resin, a polystyrene-based resin, a polyvinyl chloride-based resin, a polyvinyl butyral resin, a polyvinyl alcohol resin, a polybutadiene-based resin, a polytetrafluoroethylene-based resin or a Teflon (registered trademark)-based resin, a polyurethane resin, a cellulose-based resin, an ABS resin, a nitrile-butadiene-based rubber, a styrene-butadiene-based rubber, a silicone resin, other synthetic rubbers, natural rubber, an epoxy resin, a phenolic resin, an allyl resin, a polybenzimidazole resin, an amide-based resin, a polyimide-based resin, a polyamideimide resin, or copolymers thereof are used. Particularly, it is preferable that the interposed phase 20 contains a silicone resin or a polyimide resin, which are highly heat-resistant. As a result, the adhesiveness between the flaky magnetic metal particles and the interposed phase becomes strong, and the thermal stability or the mechanical characteristics such as strength and toughness can be easily enhanced.

Next, the third case in which the interposed phase 20 contains at least one magnetic metal selected from Fe, Co and Ni and has magnetic properties will be explained. In this case, it is preferable because, as the interposed phase has magnetic properties, the flaky magnetic metal particles 10 can readily interact magnetically, and the magnetic permeability is increased. Furthermore, since the magnetic domain structure is stabilized, the frequency characteristics of the magnetic permeability are also enhanced, which is preferable. Meanwhile, the term "magnetic properties" as used herein means ferromagnetism, ferrimagnetism, feeble magnetism, antiferromagnetism, or the like. Particularly, in the case of ferromagnetism and ferrimagnetism, the magnetic interaction is stronger, and it is preferable. In regard to the fact that the interposed phase 20 has magnetic properties, an evaluation can be performed using a VSM (Vibrating Sample Magnetometer) or the like. In regard to the fact that the interposed phase 20 contains at least one magnetic metal selected from Fe, Co and Ni and has magnetic properties, an investigation can be performed conveniently by using EDX or the like.

Thus, three embodiments of the interposed phase 20 have been described. It is preferable that at least one of these three conditions is satisfied, and it is still acceptable that two or more, or all of the three conditions be satisfied.

Figure 11:
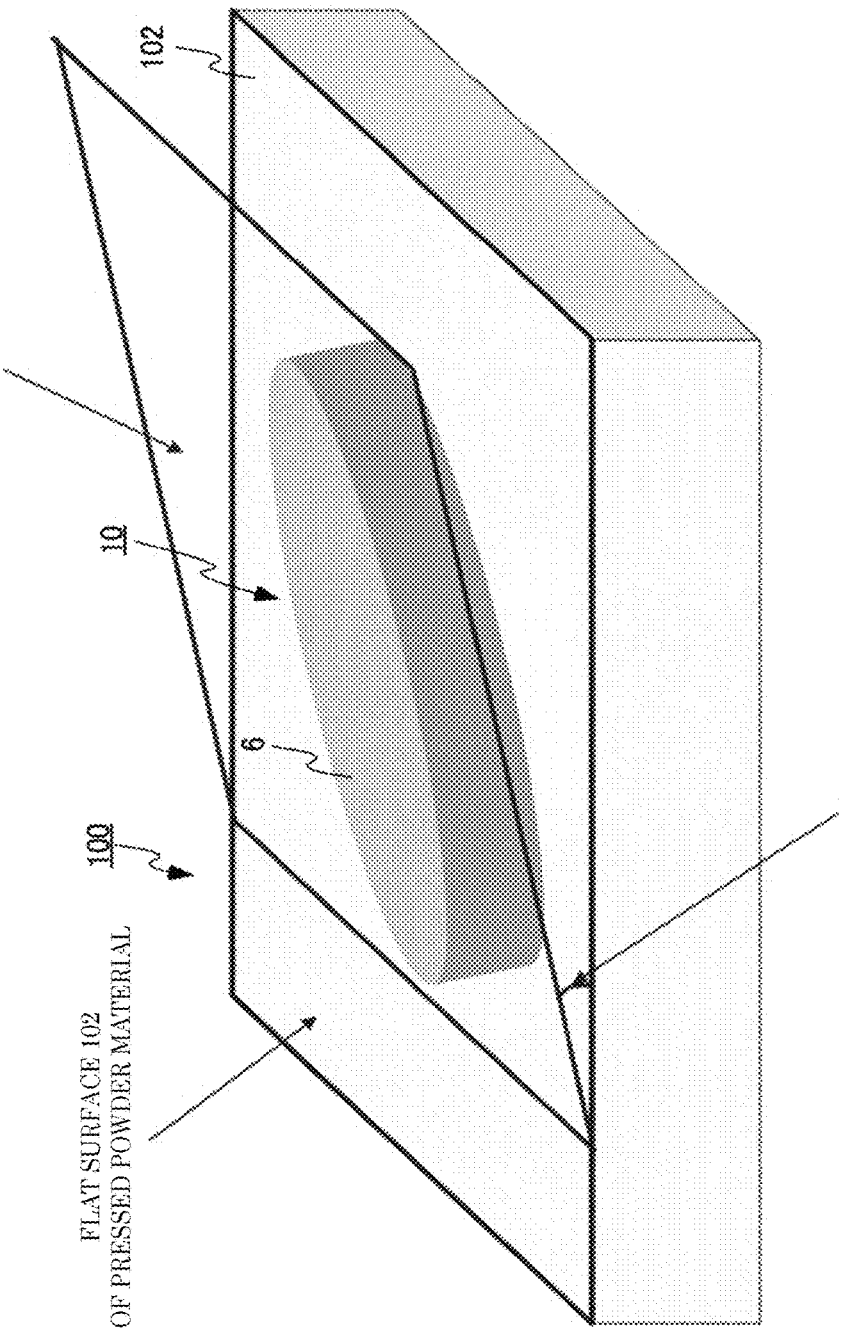
FIG. 11 is a diagram explaining the orientation of flaky magnetic metal particles in the pressed powder material of the third embodiment.

FIG. 11 is a diagram explaining the orientation of the flaky magnetic metal particles 10 in the pressed powder material of the present embodiment. Here, it is defined such that as the angle formed by a plane parallel to the flat surface of a flaky magnetic metal particle 10 and the plane 102 of the pressed powder material 100 is closer to 0°, the flaky magnetic metal particles 10 are oriented better. Specifically, when the above-mentioned angle is determined for a large number of, for example, 10 or more, flaky magnetic metal particles 10, it is desirable that the average value of the angles is preferably between 0° and 45° inclusive, more preferably between 0° and 30° inclusive, and even more preferably between 0° and 10° inclusive.

Thus, according to the pressed powder material of the present embodiment, a pressed powder material having excellent characteristics, particularly in terms of thermal stability, mechanical characteristics and the like, can be realized.

(Fourth Embodiment)

Figure 12:
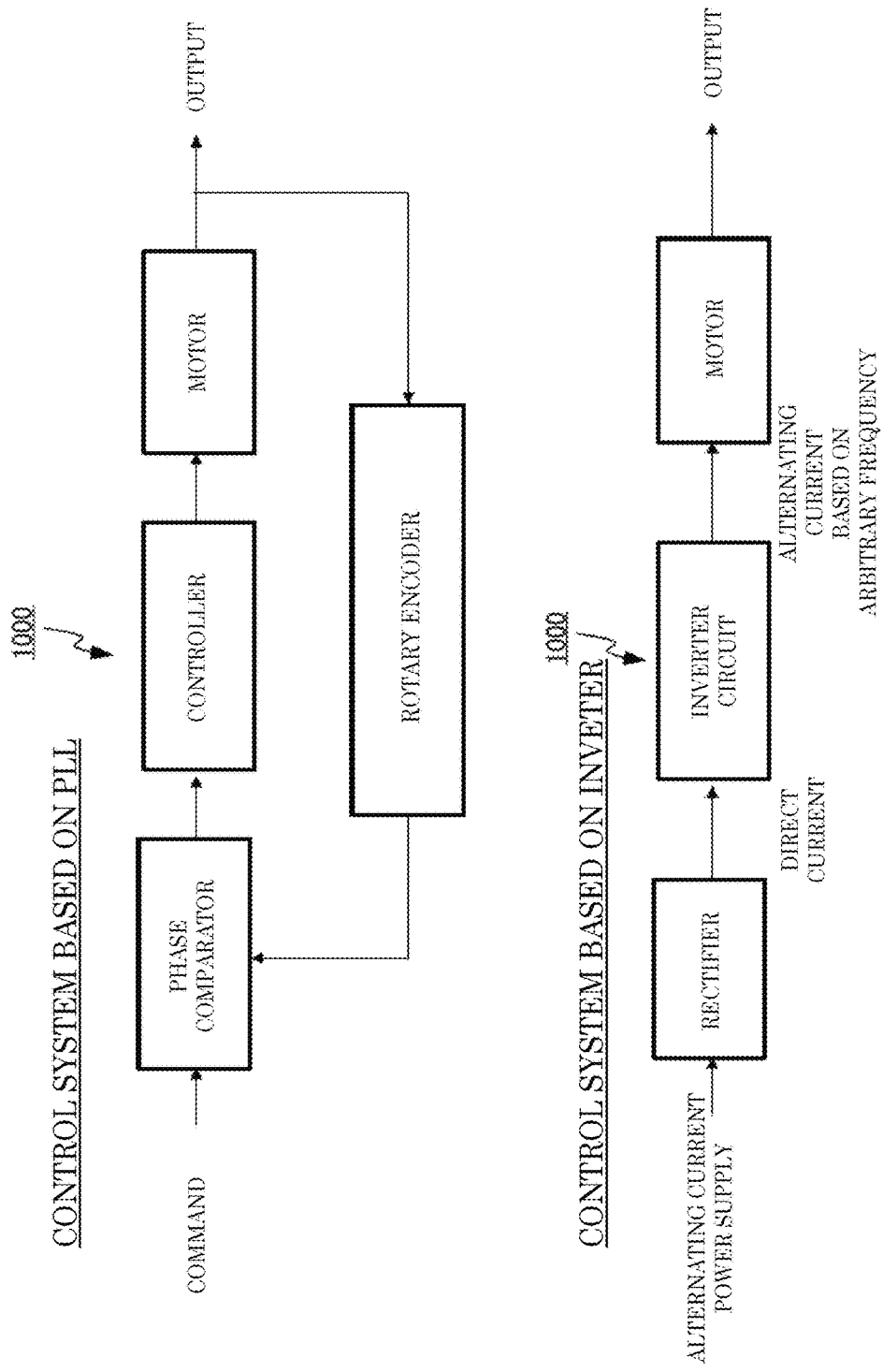
FIG. 12 is a conceptual diagram of a motor system of a fourth embodiment.

The system and the device apparatus of the present embodiment have the pressed powder materials of the first, second or third embodiment. Therefore, any matters overlapping with the contents of the first, second or third embodiment will not be described repeatedly. Examples of the component parts of the pressed powder materials included in these system and device apparatus include cores for rotating electric machines such as various motors and generators (for example, motors and generators), potential transformers, inductors, transformers, choke coils and filters; magnetic wedges for rotating electric machines. FIG. 12 shows a conceptual diagram of a motor system 1000 as an example of the rotating electric machine system. A motor system is one system including a control system for controlling the rotational frequency or the electric power (output power) of a motor. Regarding the mode for controlling the rotational frequency of a motor, there are available control methods that are based on control by a bridge servo circuit, proportional current control, voltage comparison control, frequency synchronization control, and phase locked loop (PLL) control. As an example, a control method based on PLL is illustrated in FIG. 12. The motor system 1000 that controls the rotational frequency of a motor based on PLL includes a motor; a rotary encoder that converts the amount of mechanical displacement of the rotation of the motor to an electrical signal and detects the rotational frequency of the motor; a phase comparator that compares the rotational frequency of the motor given by a certain command and the rotational frequency of the motor detected by the rotary encoder and outputs the difference of those rotational frequencies; and a controller that controls the motor so as to make the relevant difference in the rotational frequencies small. On the other hand, examples of the method for controlling the electric power of the motor include control methods that are based on pulse width modulation (PWM) control, pulse amplitude modulation (PAM) control, vector control, pulse control, bipolar drive, pedestal control, and resistance control. Other examples of the control method include control methods based on microstep drive control, multiphase drive control, inverter control, and switching control. As an example, a control method using an inverter is illustrated in FIG. 12. A motor system 1000 that controls the electric power of the motor using an inverter includes an alternative current power supply; a rectifier that converts the output of the alternative power supply to a direct current; an inverter circuit that converts the relevant direct current to an alternating current by means of an arbitrary frequency; and a motor that is controlled by the relevant alternating current.

Figure 13:
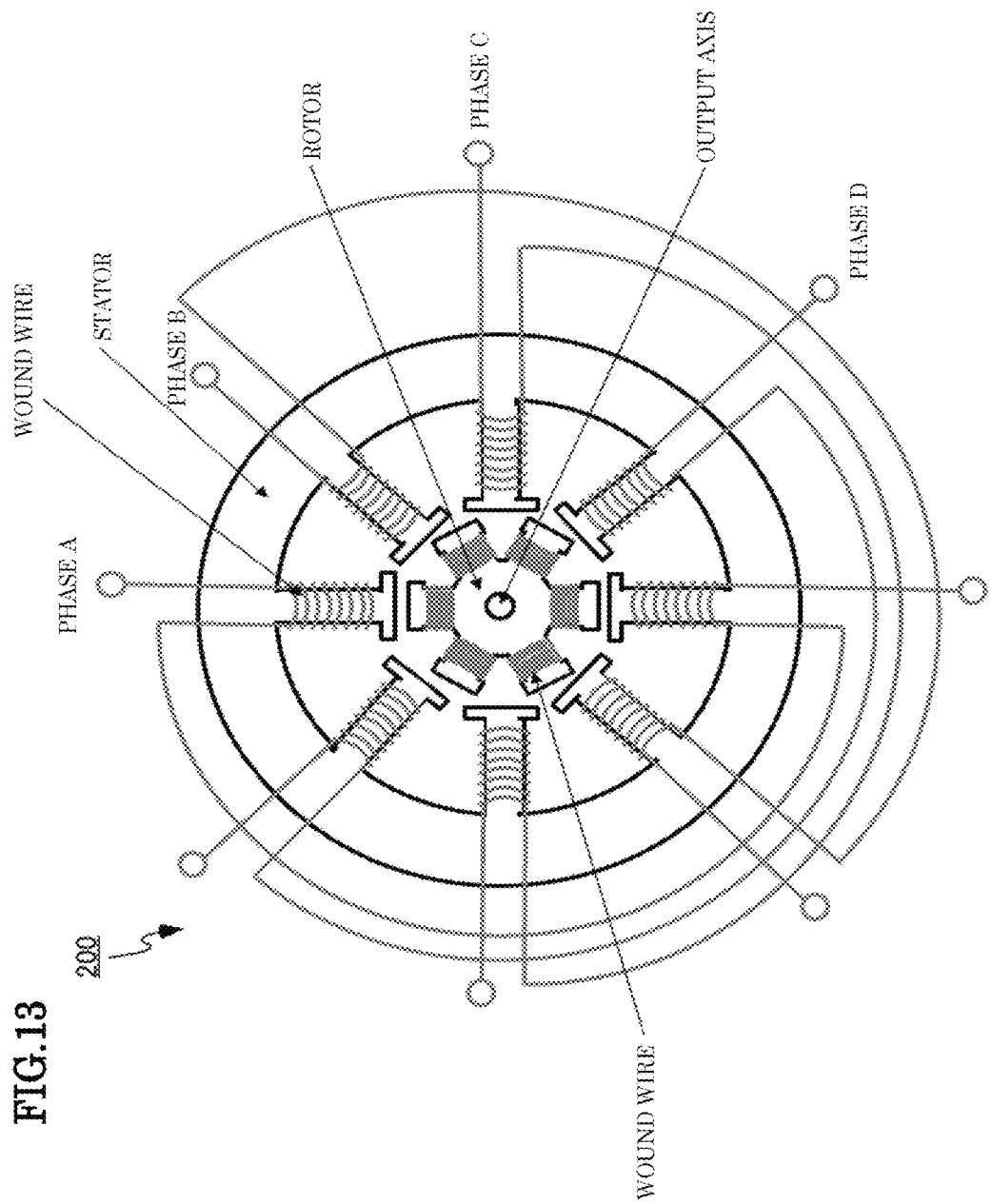
FIG. 13 is a schematic diagram of a motor of the fourth embodiment.

FIG. 13 shows a conceptual diagram of a motor 200 as an example of the rotating electric machine. In the motor 200, a first stator (stator) 210 and a second rotor (rotator) 220 are disposed. The diagram illustrates an inner rotor type motor in which a rotor is disposed inside a stator; however, the motor may also be of an outer rotor type in which the rotor is disposed outside the stator.

Figure 14B:
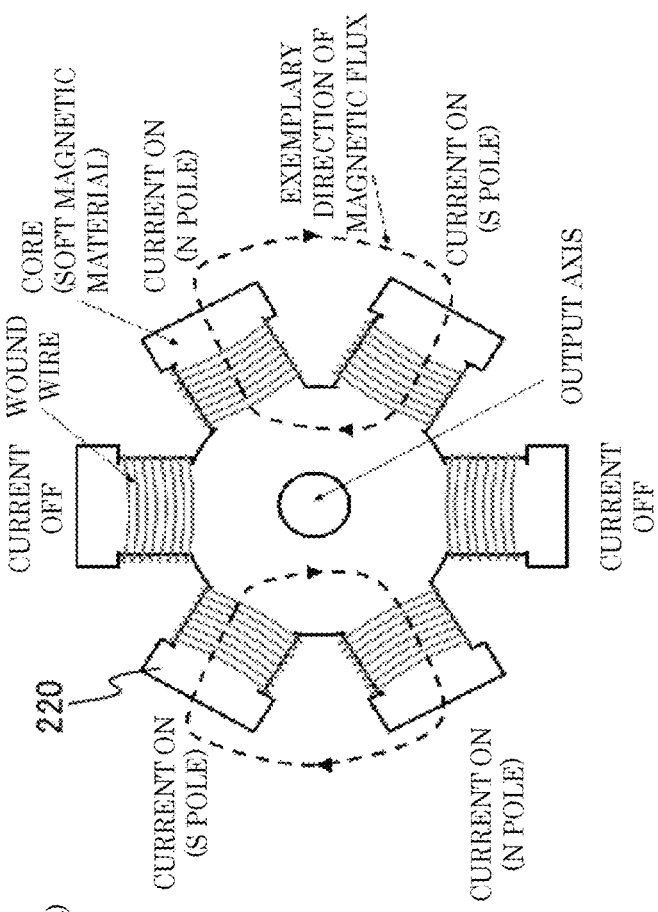
FIGS. 14A and 14B are schematic diagrams of a motor core of the fourth embodiment.
Figure 14A:
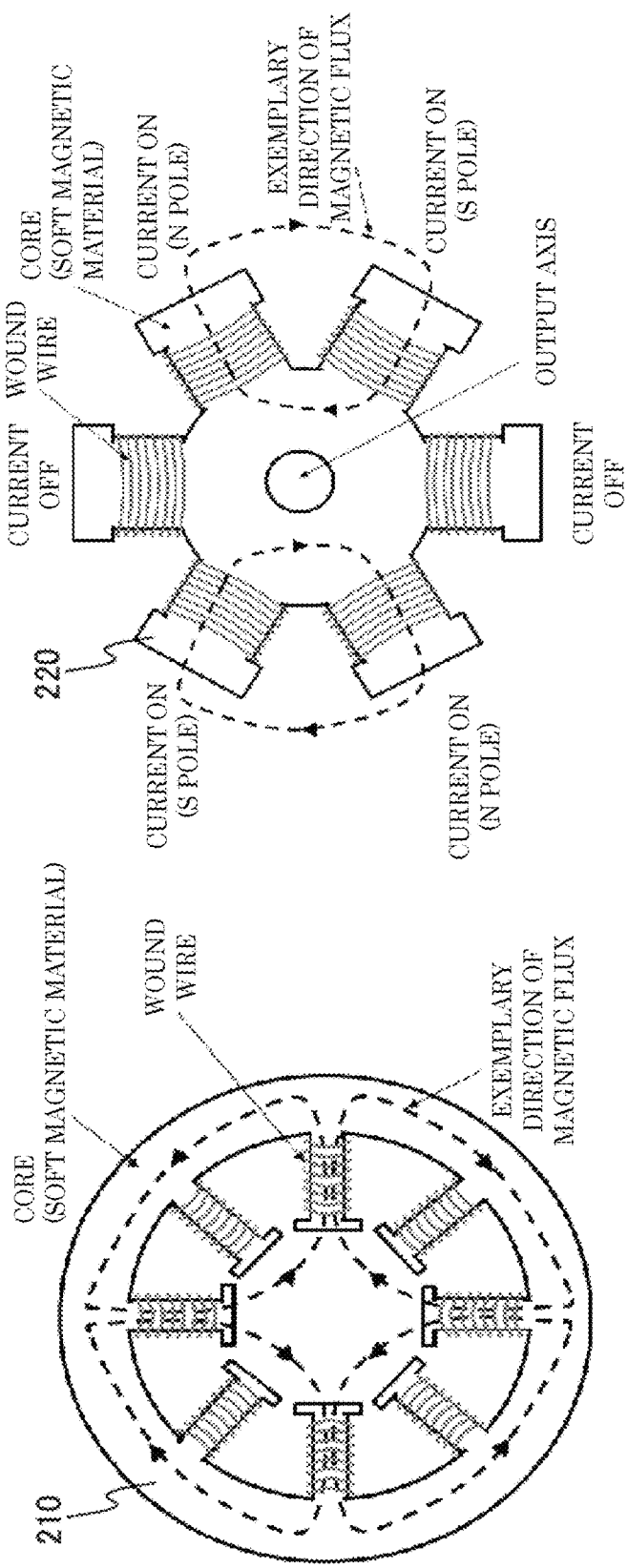

FIGS. 14A and 14B show a conceptual diagram of a motor core. The cores of a stator and a rotor correspond to the motor core. This will be explained below using FIGS. 14A and 14B. FIG. 14A is an exemplary conceptual cross-sectional view diagram of the first stator 210. The first stator 210 has a core and coils. The coils are wound around some of the protrusions provided on the inner side of the core. In this core, the pressed powder material of the first, second or third embodiment can be disposed. FIG. 14B is a conceptual cross-sectional view diagram of the first rotor 220. The first rotor 220 has a core and coils. The coils are wound around some of the protrusions provided on the outer side of the core. In this core, the pressed powder material of the first, second or third embodiment can be disposed.

FIG. 13 and FIGS. 14A and 14B are only for illustrative purposes to describe examples of motors, and the applications of the pressed powder material are not limited to them. The pressed powder material can be applied to all kinds of motors as cores for making it easy to lead the magnetic flux.

Figure 15:
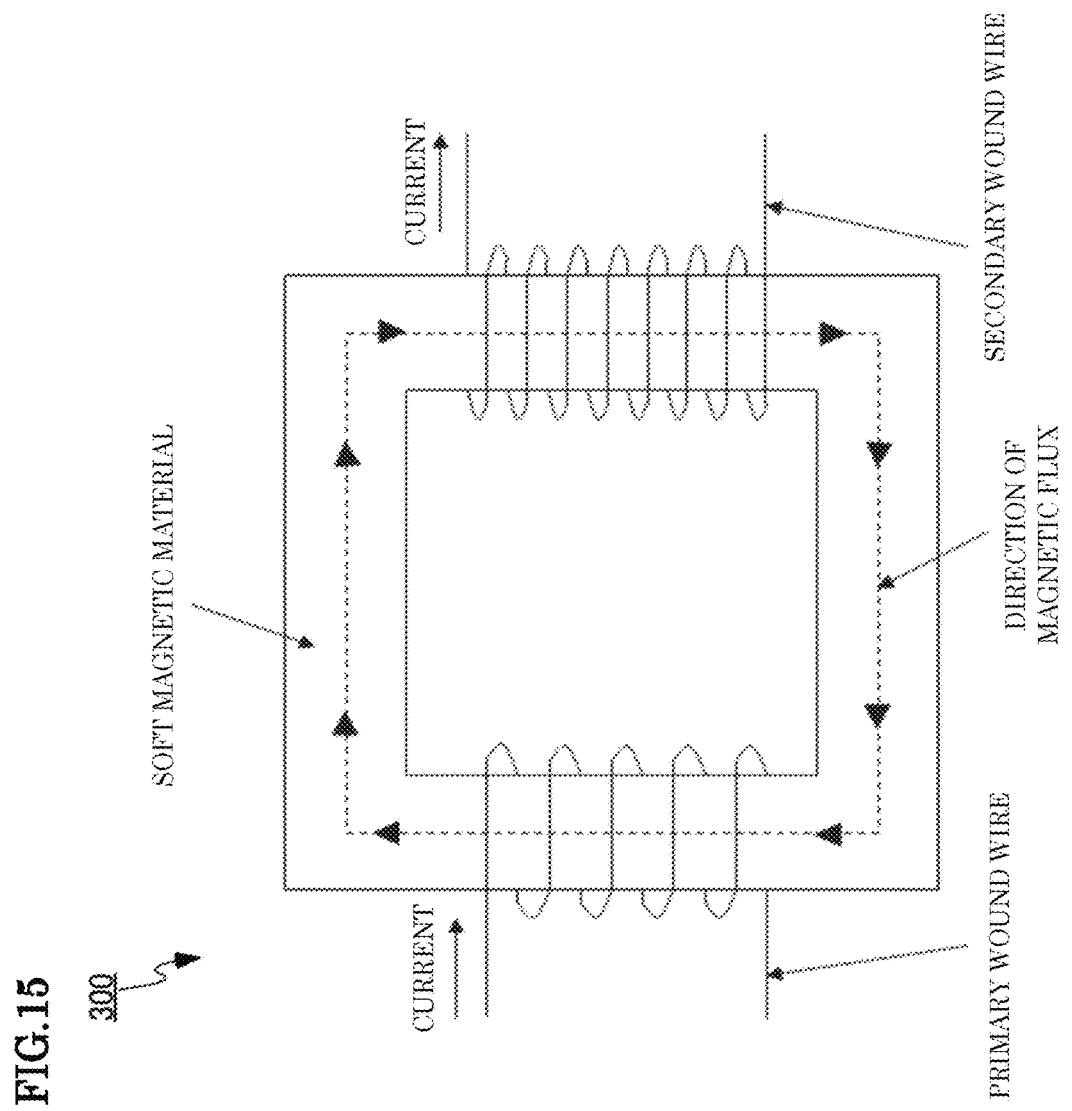
FIG. 15 is a schematic diagram of a potential transformer/transformer of the fourth embodiment.

Furthermore, a conceptual diagram of a potential transformer/transformer 300 is described in FIG. 15, and a conceptual diagram of an inductor is described in FIGS. 16A to 16D. These diagrams are only for illustrative purposes. Also for the potential transformer/transformer and the inductor, similarly to the motor core, pressed powder materials can be applied to all kinds of potential transformers/transformers and inductors in order to make it easy to guide the magnetic flux or to utilize high magnetic permeability.

Figure 17:
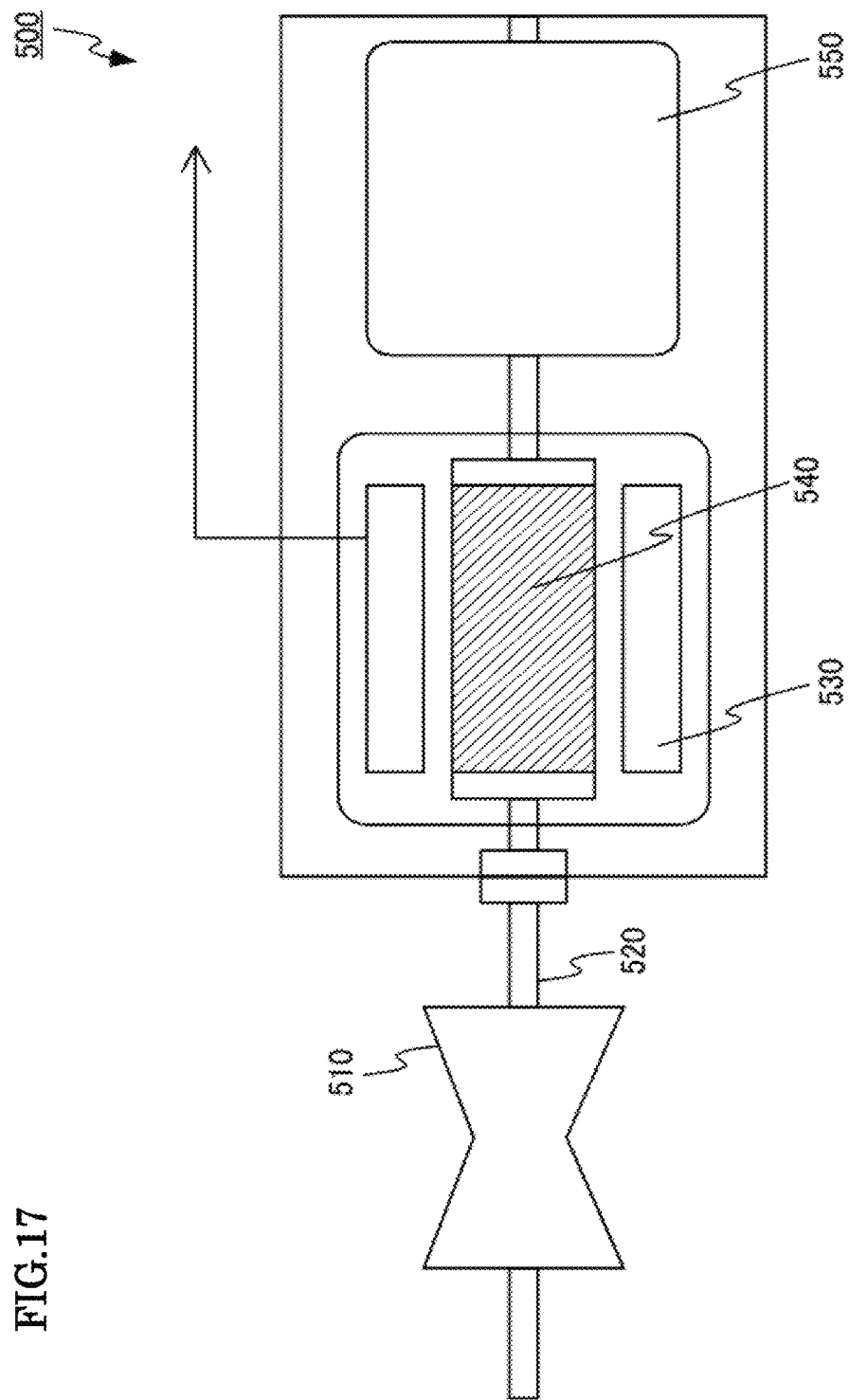
FIG. 17 is a schematic diagram of a generator of the fourth embodiment.

FIG. 17 shows a conceptual diagram of a generator 500 as an example of the rotating electric machine. The generator 500 includes any one of, or both of, a second stator (stator) 530 that uses the pressed powder material of the first, second or third embodiments; and a second rotor (rotator) 540 that uses the pressed powder material of the first, second or third embodiment. In the diagram, the second rotor (rotator) 540 is disposed inside the second stator 530; however, the second rotor may also be disposed outside the second stator. The second rotor 540 is connected to a turbine 510 provided at an end of the generator 500 through a shaft 520. The turbine 510 is rotated by, for example, a fluid supplied from the outside, which is not shown in the diagram. Meanwhile, instead of the turbine 510 that is rotated by a fluid, the shaft 520 can also be rotated by transferring dynamic rotation of the regenerative energy of an automobile or the like. Various known configurations can be employed for the second stator 530 and the second rotor 540.

The shaft 520 is in contact with a commutator (not shown in the diagram) that is disposed on the opposite side of the turbine 510 with respect to the second rotor 540. The electromotive force generated by rotation of the second rotor 540 is transmitted, as the electric power of the generator 500, after undergoing a voltage increase to the system voltage by means of an isolated phase bus that is not shown in the diagram, and a main transformer that is not shown in the diagram. Meanwhile, in the second rotor 540, an electrostatic charge is generated due to an axial current caused by the static electricity and power generation from the turbine 510. Therefore, the generator 500 includes a brush 550 intended for discharging the electrostatic charge of the second rotor 540.

Figure 18:
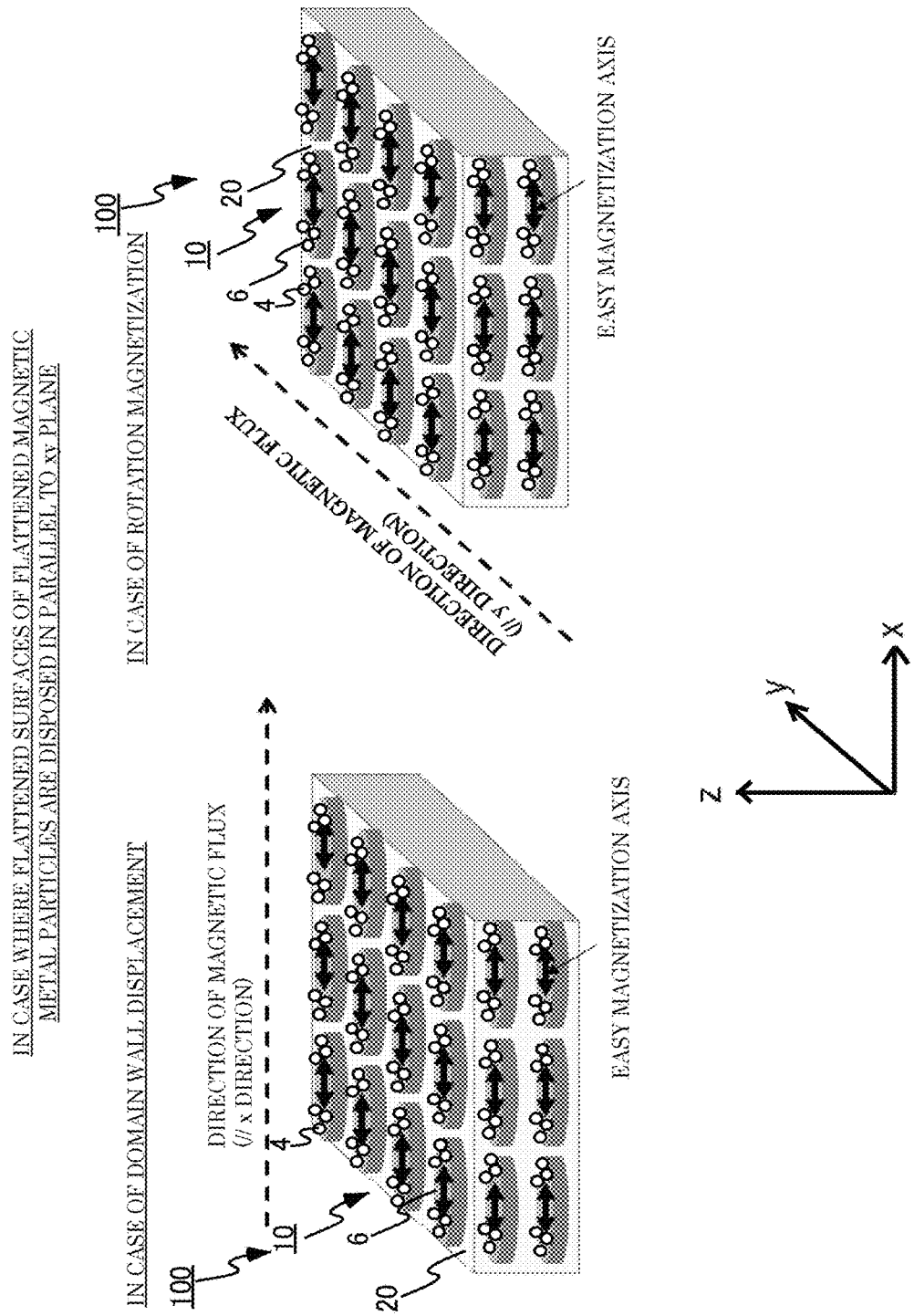
FIG. 18 is a conceptual diagram illustrating the relation between the direction of magnetic flux and the direction of disposition of a pressed powder material.

Furthermore, FIG. 18 describes a preferred example of the relations between the direction of magnetic flux and the direction of disposition of the pressed powder material. First, for both of the domain wall displacement type and the rotation magnetization type, it is preferable that the flat surfaces 10a of the flaky magnetic metal particles 10 included in the pressed powder material are disposed in directions that are aligned in parallel to one another and in layers as far as possible, with respect to the direction of magnetic flux. This is because the eddy current loss can be reduced by making the cross-sectional area of the flaky magnetic metal particles 10 that penetrate the magnetic flux, as small as possible. Furthermore, in regard to the domain wall displacement type, it is preferable that the easy magnetization axis (direction of the arrow) in the flat surface 10a of a flaky magnetic metal particle 10 is disposed in parallel to the direction of the magnetic flux. As a result, the system can be used in a direction in which coercivity is further reduced, and therefore, the hysteresis loss can be reduced, which is preferable. Furthermore, the magnetic permeability can also be made high, and it is preferable. On the contrary, in regard to the rotation magnetization type, it is preferable that the easy magnetization axis (direction of the arrow) in the flat surface 10a of a flaky magnetic metal particle 10 is disposed perpendicularly to the direction of the magnetic flux. As a result, the system can be used in a direction in which coercivity is further reduced, and therefore, the hysteresis loss can be reduced, which is preferable. That is, it is preferable to understand the magnetization characteristics of a pressed powder material, discriminate whether the pressed powder material is of domain wall displacement type or rotation magnetization type (method for discrimination is as described above), and then dispose the pressed powder material as shown in FIG. 18. In a case in which the direction of the magnetic flux is complicated, it may be difficult to dispose the pressed powder material perfectly as shown in FIG. 18; however, it is preferable to dispose the pressed powder material as shown in FIG. 18 as far as possible. It is desirable that the method for disposition described above is applied to all of the systems and device apparatuses (for example, cores for rotating electric machines such as various motors and generators (for example, motors and generators), potential transformers, inductors, transformers, choke coils, and filters; and magnetic wedges for rotating electric machines) of the present embodiment.

In order for the pressed powder material to be applied to these systems and device apparatuses, the pressed powder material is allowed to be subjected to various kinds of processing. For example, in the case of a sintered body, the pressed powder material is subjected to mechanical processing such as polishing or cutting; in the case of a powder, mixing with a resin such as an epoxy resin or a polybutadiene is carried out. If necessary, a surface treatment is carried out. Also, if necessary, a coil-winding treatment is carried out.

When the system and device apparatus of the present embodiment are used, a motor system, a motor, a potential transformer, a transformer, an inductor and a generator, all having excellent characteristics (high efficiency and low losses), can be realized.

EXAMPLES

Hereinafter, Examples 1 to 15 of the present invention will be described in more detail through a comparison with Comparative Examples 1 to 11. In regard to the flaky magnetic metal particles obtainable by Examples and Comparative Examples described below, the thickness and aspect ratio of the flaky magnetic metal particles, the ratio of the maximum length to the minimum length in the flat surface, the coefficient of variation (CV value) of the particle size distribution of the flaky magnetic metal particles, the average size of small magnetic metal particles, the average number of small magnetic metal particles (number of small magnetic metal particles integrated with one flaky magnetic metal particle), and the lattice strain of the flaky magnetic metal particles are shown in Table 1. Measurement of the thickness and the aspect ratio of the flaky magnetic metal particles, the ratio of the maximum length to the minimum length in the flat surface, the average size of the small magnetic metal particles, and the average number of the small magnetic metal particles is based on TEM observations and SEM observations, and these properties are calculated as average values of a large number of particles. Regarding the measurement of the coefficient of variation (CV value) of the particle size distribution of the flaky magnetic metal particles, the coefficient of variation is calculated as a measured value obtained with a particle size distribution analyzer. The lattice strain is analyzed by XRD.

Example 1

First, a ribbon of Fe—Co—Si—B (Fe:Co=70:30 atom %) is produced using a single roll cooling apparatus. Next, this ribbon is cut into an appropriate size using a mixing apparatus. Subsequently, the ribbon fragments thus cut are collected and subjected to pulverization and rolling at about 1000 rpm in an argon (Ar) atmosphere using a bead mill which uses $ZrO_2$ balls and a $ZrO_2$ vessel, to convert the ribbon fragments into a flat powder. Next, the powder thus obtained is subjected to a heat treatment at 300° C. in a hydrogen ($H_2$) atmosphere. Subsequently, the powder thus obtained is pulverized with a bead mill using liquid nitrogen. Subsequently, a heat treatment is performed at 400° C. in a $H_2$ atmosphere, and thus flat magnetic metal particles are obtained. The flat magnetic metal particles are treated so as to acquire a predetermined size and a predetermined structure, by repeating the processes of pulverization/rolling, heat treatment, liquid nitrogen pulverization, and heat treatment. Meanwhile, the crystal structure of the magnetic phase of the flat magnetic metal particles is a body-centered cubic structure. Furthermore, the surface of the flat magnetic metal particles thus obtained is coated with a non-magnetic $SfO_2$ layer to a thickness of 20 nm by a sol-gel method. Subsequently, the coated flat magnetic metal particles are mixed with an inorganic oxide binder phase ($B_2O_3$—$Bi_2O_3$—$ZnO$; softening point: 425° C.), and the mixture is subjected to molding in a magnetic field (orienting the flaky particles) and a heat treatment. Thus, a pressed powder material is obtained. Meanwhile, the heat treatment is performed at a temperature slightly higher than the softening point.

Example 2

A pressed powder material is produced in an almost the same manner as in Example 1, except that the thickness of the flat magnetic metal particles is 1 μm.

Example 3

A pressed powder material is produced in an almost the same manner as in Example 1, except that the thickness of the flat magnetic metal particles is 10 μm.

Example 4

A pressed powder material is produced in an almost the same manner as in Example 1, except that the thickness of the flat magnetic metal particles is 100 μm.

Example 5

A pressed powder material is produced in an almost the same manner as in Example 1, except that the aspect ratio of the flaky magnetic metal particles is 100.

Example 6

A pressed powder material is produced in an almost the same manner as in Example 1, except that the aspect ratio of the flaky magnetic metal particles is 10,000.

Example 7

A pressed powder material is produced in an almost the same manner as in Example 3, except that the ratio of the maximum length to the minimum length in the flat surface of the flaky magnetic metal particles is 5.

Example 8

A pressed powder material is produced in an almost the same manner as in Example 3, except that the coefficient of variation (CV value) of the particle size distribution of the flaky magnetic metal particles is 60%.

Example 9

A pressed powder material is produced in an almost the same manner as in Example 3, except that the average particle size of the small magnetic metal particles is 10 nm.

Example 10

A pressed powder material is produced in an almost the same manner as in Example 3, except that the average particle size of the small magnetic metal particles is 1 μm.

Example 11

A pressed powder material is produced in an almost the same manner as in Example 3, except that the average number of the small magnetic metal particles becomes 5.

Example 12

A pressed powder material is produced in an almost the same manner as in Example 3, except that the lattice strain of the flaky magnetic metal particles is 0.01%.

Example 13

A pressed powder material is produced in an almost the same manner as in Example 3, except that the lattice strain of the flaky magnetic metal particles is 9.6%.

Example 14

A pressed powder material is produced in an almost the same manner as in Example 3, except that the flaky magnetic metal particles are oriented in the (110) direction.

Example 15

A pressed powder material is produced in an almost the same manner as in Example 3, except that uniaxial anisotropy is imparted, that is, magnetic anisotropy in one direction is imparted, to the flat surface plane of the flaky magnetic metal particles by a heat treatment in a magnetic field.

Comparative Example 1

A pressed powder material is produced in an almost the same manner as in Example 3, except that the average number of the small magnetic metal particles becomes 4.

Comparative Example 2

A pressed powder material is produced in an almost the same manner as in Example 1, except that the thickness of the flaky magnetic metal particles is 8 nm.

Comparative Example 3

A pressed powder material is produced in an almost the same manner as in Example 4, except that the thickness of the flaky magnetic metal particles is 120 μm.

Comparative Example 4

A pressed powder material is produced in an almost the same manner as in Example 1, except that the aspect ratio of the flaky magnetic metal particles is 4.

Comparative Example 5

A pressed powder material is produced in an almost the same manner as in Example 1, except that the aspect ratio of the flaky magnetic metal particles is 12,000.

Comparative Example 6

A pressed powder material is produced in an almost the same manner as in Example 3, except that the ratio of the maximum length to the minimum length in the flat surface of the flaky magnetic metal particles is 6.

Comparative Example 7

A pressed powder material is produced in an almost the same manner as in Example 3, except that the coefficient of variation (CV value) of the particle size distribution of the flaky magnetic metal particles is 65%.

Comparative Example 8

A pressed powder material is produced in an almost the same manner as in Example 3, except that the average size of the small magnetic metal particles is 8 nm.

Comparative Example 9

A pressed powder material is produced in an almost the same manner as in Example 3, except that the average size of the small magnetic metal particles is 2 μm.

Comparative Example 10

A pressed powder material is produced in an almost the same manner as in Example 3, except that the lattice strain of the flaky magnetic metal particles is 0.008%.

Comparative Example 11

A pressed powder material is produced in an almost the same manner as in Example 3, except that the lattice strain of the flaky magnetic metal particles is 10.5%.

Next, in regard to the materials for evaluation of Examples 1 to 15 and Comparative Examples 1 to 11, the saturation magnetization, the real part of magnetic permeability ($\mu'$), magnetic permeability loss (tan δ), the change-over time in the real part of the magnetic permeability ($\mu'$) after 100 hours, core loss, and the strength ratio are evaluated by the following methods. The evaluation results are presented in Table 2.

(1) Saturation magnetization: The saturation magnetization at room temperature is measured using a VSM.

(2) Real part of magnetic permeability $\mu'$ and magnetic permeability loss (tan $\delta = \mu''/\mu' \times 100(\%)$): The magnetic permeability of a ring-shaped sample is measured using an impedance analyzer. The real part of magnetic permeability $\mu'$ and the imaginary part of magnetic permeability $\mu''$ at a frequency of 1 kHz are measured. Furthermore, the magnetic permeability loss or loss factor, tan δ, is calculated by the formula: $\mu''/\mu' \times 100(\%)$.

(3) Changeover time of real part of magnetic permeability μ' after 100 hours: A sample for evaluation is heated at a temperature of 60° C. in air for 100 hours, and then the real part of the magnetic permeability μ' is measured again. Thus, the change over time (real part of magnetic permeability μ' after standing for 100 hours/real part of magnetic permeability μ' before standing) is determined.

(4) Core loss: The core loss under the operating conditions of 1 kHz and 1 T is measured using a B—H analyzer.

(5) Strength ratio: The flexural strength of a sample for evaluation is measured, and this is represented by the ratio with respect to the flexural strength of a comparative sample (=flexural strength of the evaluated sample/flexural strength of comparative sample). Furthermore, the strength ratios of Examples are presented as ratios with respect to Comparative Example 1.

TABLE 1

|  | Thickness | Aspect ratio | Ratio of maximum length to minimum length in flat surface | Coefficient of variation, CV value, of particle size distribution of flaky magnetic metal particles (%) | Average size of small magnetic metal particles | Average number of small magnetic metal particles (particles) | Lattice strain (%) | Remarks |
|---|---|---|---|---|---|---|---|---|
| Example 1 | 10 nm | 10 | 2 | 32 | 20 nm | 15 | 0.10 | — |
| Example 2 | 1 μm | 8 | 3 | 28 | 30 nm | 25 | 0.12 | — |
| Example 3 | 10 μm | 6 | 2 | 32 | 22 nm | 16 | 0.11 | — |
| Example 4 | 100 μm | 5 | 2 | 35 | 25 nm | 18 | 0.10 | — |
| Example 5 | 10 nm | 100 | 2 | 26 | 30 nm | 20 | 0.10 | — |
| Example 6 | 10 nm | 10000 | 3 | 24 | 20 nm | 16 | 0.11 | — |
| Example 7 | 10 μm | 6 | 5 | 30 | 24 nm | 15 | 0.12 | — |
| Example 8 | 10 μm | 6 | 2 | 60 | 21 nm | 17 | 0.11 | — |
| Example 9 | 10 μm | 6 | 3 | 25 | 10 nm | 18 | 0.10 | — |
| Example 10 | 10 μm | 6 | 2 | 24 | 1 μm | 10 | 0.11 | — |
| Example 11 | 10 μm | 6 | 2 | 28 | 20 nm | 5 | 0.12 | — |
| Example 12 | 10 μm | 6 | 2 | 30 | 21 nm | 18 | 0.01 | — |
| Example 13 | 10 μm | 6 | 3 | 26 | 23 nm | 17 | 9.6 | — |
| Example 14 | 10 μm | 6 | 3 | 25 | 18 nm | 16 | 0.10 | (110) orientation |
| Example 15 | 10 μm | 6 | 2 | 27 | 19 nm | 18 | 0.35 | In-plane uniaxial anisotropy |
| Comparative Example 1 | 10 μm | 6 | 6 | 36 | 30 nm | 4 | 0.17 | — |
| Comparative Example 2 | 8 nm | 11 | 2 | 30 | 21 nm | 18 | 0.13 | — |
| Comparative Example 3 | 120 μm | 5 | 2 | 38 | 22 nm | 16 | 0.12 | — |
| Comparative Example 4 | 10 nm | 4 | 2 | 25 | 32 nm | 22 | 0.12 | — |
| Comparative Example 5 | 10 nm | 12000 | 3 | 28 | 28 nm | 18 | 0.13 | — |
| Comparative Example 6 | 10 μm | 6 | 6 | 32 | 26 nm | 17 | 0.12 |  |
| Comparative Example 7 | 10 μm | 6 | 2 | 65 | 24 nm | 16 | 0.15 | — |
| Comparative Example 8 | 10 μm | 6 | 2 | 32 | 8 nm | 18 | 0.16 | — |
| Comparative Example 9 | 10 μm | 6 | 2 | 28 | 2 μm | 20 | 0.14 | — |
| Comparative Example 10 | 10 μm | 6 | 2 | 46 | 26 nm | 15 | 0.008 | — |
| Comparative Example 11 | 10 μm | 6 | 2 | 35 | 28 nm | 16 | 10.5 | — |

TABLE 2

|  | Saturation magnetization (T) | μ' (1 kHz) | tan δ (%) (1 kHz) | Core loss (kW/m³) | Proportion of change over time in μ' (%) | Strength ratio |
|---|---|---|---|---|---|---|
| Example 1 | 1.8 | 160 | ≈0 | 500 | 93 | 1.2 |
| Example 2 | 1.8 | 140 | ≈0 | 560 | 94 | 1.2 |
| Example 3 | 1.8 | 120 | ≈0 | 600 | 92 | 1.3 |
| Example 4 | 1.8 | 130 | ≈0 | 800 | 93 | 1.2 |
| Example 5 | 1.8 | 220 | ≈0 | 700 | 91 | 1.2 |
| Example 6 | 1.8 | 350 | ≈0 | 700 | 94 | 1.2 |
| Example 7 | 1.8 | 130 | ≈0 | 610 | 93 | 1.2 |
| Example 8 | 1.8 | 140 | ≈0 | 590 | 92 | 1.3 |
| Example 9 | 1.8 | 140 | ≈0 | 600 | 94 | 1.2 |

TABLE 2-continued

|  | Saturation magnetization (T) | μ' (1 kHz) | tan δ (%) (1 kHz) | Core loss (kW/m³) | Proportion of change over time in μ' (%) | Strength ratio |
|---|---|---|---|---|---|---|
| Example 10 | 1.8 | 135 | ≈0 | 620 | 94 | 1.3 |
| Example 11 | 1.8 | 140 | ≈0 | 610 | 92 | 1.3 |
| Example 12 | 1.8 | 140 | ≈0 | 600 | 93 | 1.2 |
| Example 13 | 1.8 | 120 | ≈0 | 590 | 94 | 1.3 |
| Example 14 | 1.8 | 160 | ≈0 | 600 | 94 | 1.2 |
| Example 15 | 1.8 | 130 | ≈0 | 580 | 93 | 1.3 |
| Comparative Example 1 | 1.8 | 140 | ≈0 | 650 | 88 | — |
| Comparative Example 2 | 1.8 | 180 | ≈0 | 600 | 87 | 1.1 |
| Comparative Example 3 | 1.8 | 130 | ≈0 | 800 | 87 | 1.1 |
| Comparative Example 4 | 1.8 | 140 | ≈0 | 600 | 86 | 1.1 |
| Comparative Example 5 | 1.8 | 370 | ≈0 | 700 | 88 | 1.1 |
| Comparative Example 6 | 1.8 | 150 | ≈0 | 650 | 86 | 1.1 |
| Comparative Example 7 | 1.8 | 140 | ≈0 | 640 | 87 | 1.1 |
| Comparative Example 8 | 1.8 | 130 | ≈0 | 660 | 88 | 1.1 |
| Comparative Example 9 | 1.8 | 140 | ≈0 | 630 | 86 | 1.1 |
| Comparative Example 10 | 1.8 | 140 | ≈0 | 640 | 87 | 1.1 |
| Comparative Example 11 | 1.8 | 110 | ≈0 | 650 | 88 | 1.1 |

As is obvious from Table 1, the flaky magnetic metal particles related to Examples 1 to 15 have a thickness of between 10 nm and 100 μm inclusive, an aspect ratio of between 5 and 10,000 inclusive, a ratio of the maximum length to the minimum length in the flat surface of between 1 and 5 inclusive on the average, an average size of the small magnetic metal particles of between 10 nm and 1 μm inclusive, an average number of the small magnetic metal particles of 5 or more, and a lattice strain of between 0.01% and 10% inclusive. Furthermore, in Example 14, the flat surfaces of the flaky magnetic metal particles are oriented in the (110) direction. In Example 15, the flaky magnetic metal particles have uniaxial anisotropy in the flat surface plane.

As is obvious from Table 2, it is understood that the pressed powder materials using the flaky magnetic metal particles of Examples 1 to 15 are particularly superior in the proportion of change over time in the magnetic permeability and the strength ratio, compared to the pressed powder materials of Comparative Examples. That is, it is understood that the pressed powder materials have superior thermal stability and mechanical strength. Furthermore, it is understood that the pressed powder materials of Examples 1 to 15 also have excellent magnetic characteristics such as high saturation magnetization, high magnetic permeability, and low losses. On the other hand, since the materials are pressed powder materials, the can be applied to complicated shapes.

Example 16

A pressed powder material is produced in an almost the same manner as in Example 3, except that the surface of the flaky magnetic metal particles is coated with a non-magnetic SiO₂ layer to a thickness of about 1 nm by a sol-gel method.

Example 17

A pressed powder material is produced in an almost the same manner as in Example 3, except that the surface of the flaky magnetic metal particles is coated with a non-magnetic SiO₂ layer to a thickness of about 10 nm by a sol-gel method.

Example 18

A pressed powder material is produced in an almost the same manner as in Example 3, except that the surface of the flaky magnetic metal particles is coated with a non-magnetic SiO₂ layer to a thickness of about 100 nm by a sol-gel method.

Example 19

A pressed powder material is produced in an almost the same manner as in Example 3, except that the surface of the flaky magnetic metal particles is coated with a non-magnetic SiO₂ layer to a thickness of about 900 nm by a sol-gel method.

Example 20

A pressed powder material is produced in an almost the same manner as in Example 1, except that the pressed powder material of the present Example has an eutectic system having a softening point of 200° C. The composition of the eutectic system is P—V—Ag—O.

Example 21

A pressed powder material is produced in an almost the same manner as in Example 3, except that the pressed powder material of the present Example has a binder phase having a softening point of about 300° C. The composition of the binder phase is Pb—B—O.

Example 22

A pressed powder material is produced in an almost the same manner as in Example 3, except that the pressed powder material of the present Example has a binder phase having a softening point of about 400° C. The composition of the binder phase is Bi—B—O.

Example 23

A pressed powder material is produced in an almost the same manner as in Example 3, except that the pressed powder material of the present Example has a binder phase having a softening point of about 500° C. The composition of the binder phase is B—Bi—Zn—O.

Example 24

A pressed powder material is produced in an almost the same manner as in Example 3, except that the pressed powder material of the present Example has a binder phase having a softening point of about 600° C. The composition of the binder phase is B—Bi—Si—O.

Example 25

A pressed powder material is produced in an almost the same manner as in Example 3, except that in the pressed powder material of the present Example, a binder phase in a spherical form having a particle size of 50 nm is produced at the surface of the flaky magnetic metal particles by extending the heat treatment time to two times during the heat treatment after the molding in a magnetic field. The composition of the binder phase is B—Bi—Zn—O.

Comparative Example 12

A pressed powder material is produced in an almost the same manner as in Example 3, except that coating of the surface of the flaky magnetic metal particles with a non-magnetic $SiO_2$ layer is not performed.

Comparative Example 13

A pressed powder material is produced in an almost the same manner as in Example 3, except that the surface of the flaky magnetic metal particles is coated with a non-magnetic $SiO_2$ layer to a thickness of about 2 μm by a sol-gel method.

Comparative Example 14

A pressed powder material is produced in an almost the same manner as in Example 3, except that the pressed powder material has a binder phase having a softening point of about 100° C. Regarding the binder phase, an organic epoxy resin is used.

Comparative Example 15

A pressed powder material is produced in an almost the same manner as in Example 3, except that the pressed powder material has a binder phase having a softening point of about 700° C. The composition of the binder phase is Si—B—Al—O.

TABLE 3

| | Thickness | Aspect ratio | Ratio of maximum length to minimum length in flat surface | Coefficient of variation, CV value, of particle size distribution of flaky magnetic metal particles (%) | Average size of small magnetic metal particles | Average number of small magnetic metal particles (particles) | Lattice strain (%) | Remarks |
|---|---|---|---|---|---|---|---|---|
| Example 16 | 10 μm | 6 | 2 | 32 | 22 nm | 16 | 0.11 | Coating layer thickness: about 1 nm |
| Example 17 | 10 μm | 6 | 2 | 32 | 22 nm | 16 | 0.11 | Coating layer thickness: about 10 nm |
| Example 18 | 10 μm | 6 | 2 | 32 | 22 nm | 16 | 0.11 | Coating layer thickness: about 100 nm |
| Example 19 | 10 μm | 6 | 2 | 32 | 22 nm | 16 | 0.11 | Coating layer thickness: about 900 nm |
| Example 20 | 10 μm | 6 | 2 | 32 | 22 nm | 16 | 0.11 | Binder phase, softening point: about 200° C. |
| Example 21 | 10 μm | 6 | 2 | 32 | 22 nm | 16 | 0.11 | Binder phase, softening point: about 300° C. |
| Example 22 | 10 μm | 6 | 2 | 32 | 22 nm | 16 | 0.11 | Binder phase, softening point: about 400° C. |
| Example 23 | 10 μm | 6 | 2 | 32 | 22 nm | 16 | 0.11 | Binder phase, softening point: about 500° C. |
| Example 24 | 10 μm | 6 | 2 | 32 | 22 nm | 16 | 0.11 | Binder phase, softening point: about 600° C. |
| Example 25 | 10 μm | 6 | 2 | 32 | 22 nm | 16 | 0.11 | Spherical binder phase exists |

TABLE 3-continued

| | Thickness | Aspect ratio | Ratio of maximum length to minimum length in flat surface | Coefficient of variation, CV value, of particle size distribution of flaky magnetic metal particles (%) | Average size of small magnetic metal particles | Average number of small magnetic metal particles (particles) | Lattice strain (%) | Remarks |
|---|---|---|---|---|---|---|---|---|
| Comparative Example 12 | 10 μm | 6 | 2 | 32 | 22 nm | 16 | 0.11 | No coating layer |
| Comparative Example 13 | 10 μm | 6 | 2 | 32 | 22 nm | 16 | 0.11 | Coating layer thickness: about 2 μm |
| Comparative Example 14 | 10 μm | 6 | 2 | 32 | 22 nm | 16 | 0.11 | Binder phase, softening point: about 100° C. |
| Comparative Example 15 | 10 μm | 6 | 2 | 32 | 22 nm | 16 | 0.11 | Binder phase, softening point: about 700° C. |

TABLE 4

| | Saturation magnetization (T) | μ' (1 kHz) | tan δ (%) (1 kHz) | Core loss (kW/m$^3$) | Proportion of change over time in μ' (%) | Strength ratio |
|---|---|---|---|---|---|---|
| Example 16 | 1.8 | 120 | ≈0 | 680 | 92 | 1.3 |
| Example 17 | 1.8 | 130 | ≈0 | 660 | 93 | 1.2 |
| Example 18 | 1.8 | 110 | ≈0 | 660 | 92 | 1.3 |
| Example 19 | 1.7 | 90 | ≈0 | 700 | 93 | 1.2 |
| Example 20 | 1.8 | 120 | ≈0 | 630 | 92 | 1.2 |
| Example 21 | 1.8 | 120 | ≈0 | 640 | 93 | 1.2 |
| Example 22 | 1.8 | 140 | ≈0 | 620 | 93 | 1.3 |
| Example 23 | 1.8 | 140 | ≈0 | 620 | 93 | 1.3 |
| Example 24 | 1.8 | 130 | ≈0 | 640 | 92 | 1.2 |
| Example 25 | 1.8 | 150 | ≈0 | 600 | 94 | 1.4 |
| Comparative Example 12 | 1.8 | 100 | ≈0 | 800 | 85 | 1.1 |
| Comparative Example 13 | 1.5 | 90 | ≈0 | 780 | 84 | 1.1 |
| Comparative Example 14 | 1.8 | 90 | ≈0 | 760 | 86 | 1.1 |
| Comparative Example 15 | 1.8 | 80 | ≈0 | 800 | 83 | 1.1 |

As is obvious from Table 3, the flaky magnetic metal particles related to Examples 16 to 25 have a thickness of between 10 nm and 100 μm inclusive, an aspect ratio of between 5 and 10,000 inclusive, a ratio of the maximum length to the minimum length in the flat surface of between 1 and 5 inclusive on the average, an average size of the small magnetic metal particles of between 10 nm and 1 μm inclusive, an average number of the small magnetic metal particles of 5 or more, and a lattice strain of between 0.01% and 10% inclusive. Furthermore, the surface of the flaky magnetic metal particles is coated with a non-magnetic oxide layer having a thickness of between 0.1 nm and 1 μm inclusive. Also, the softening point of the binder phase is between 200° C. and 600° C. inclusive.

On the other hand, Comparative Example 12 has no coating layer, and Comparative Example 13 has a coating layer having a thickness as large as about 2 μm. Furthermore, Comparative Example 14 has a binder phase having a softening point of about 100° C., and Comparative Example 15 has a binder phase having a softening point of about 700° C. That is, Comparative Examples 12 to 15 are not included in the scope of the claims.

As is obvious from Table 4, it is understood that the pressed powder materials that use the flaky magnetic metal particles of Examples 16 to 25 are superior particularly in terms of the proportion of change over time in the magnetic permeability and the strength ratio, compared to the pressed powder materials of Comparative Examples. That is, it is understood that the pressed powder materials have superior thermal stability and mechanical strength. Furthermore, it is understood that the pressed powder materials of Examples 16 to 25 also have excellent magnetic characteristics such as high saturation magnetization, high magnetic permeability, and low losses. On the other hand, since the materials are pressed powder materials, the materials can be applied to complicated shapes.

That is, it is understood that the pressed powder materials related to Example 16 to Example 25 are soft magnetic pressed powder materials that satisfy the requirements of high saturation magnetization, high magnetic permeability, low losses, high thermal stability, high oxidation resistance, and high strength, and can be applied to complicated shapes.

While certain embodiments have been described, these embodiments have been presented by way of example only, and are not intended to limit the scope of the inventions. Indeed, a soft magnetic material, a rotating electric machine, a motor, and a generator described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

The examples disclosed in the specification are shown below.

Technological Example 1. A plurality of flaky magnetic metal particles, each of the flaky magnetic metal particles including:
- a first magnetic particle including
  - a flat surface,
  - at least one first element selected from the group consisting of Fe, Co and Ni,
  - an average ratio between the maximum length and the minimum length in the flat surface being between 1 and 5 inclusive,
  - an average thickness of the first magnetic particles being between 10 nm and 100 μm inclusive,
  - an average aspect ratio of the first magnetic particles being between 5 and 10000 inclusive; and
- a plurality of second magnetic particles disposed on the flat surface, an average number of the second magnetic particles being five or more, an average diameter of the second magnetic particles being between 10 nm and 1 μm inclusive.

Technological Example 2. The flaky magnetic metal particles according to Technological example 1, wherein the CV value of the flaky magnetic metal particles is between 0.1% and 60% inclusive.

Technological Example 3. The flaky magnetic metal particles according to Technological examples 1, or 2, wherein the flaky magnetic metal particles have a portion having a crystal structure of a body-centered cubic structure and contain iron (Fe) and cobalt (Co), and the amount of Co is between 10 atom % and 60 atom % inclusive relative to the total amount of Fe and Co.

Technological Example 4. The flaky magnetic metal particles according to Technological examples 1, 2, or 3, wherein the lattice strain of the flaky magnetic metal particles is between 0.01% and 10% inclusive.

Technological Example 5. The flaky magnetic metal particles according to Technological examples 1, 2, 3, or 4, wherein the flat surface is oriented in the (110) direction.

Technological Example 6. The flaky magnetic metal particles according to Technological examples 1, 2, 3, 4, or 5, wherein the flaky magnetic metal particles have magnetic anisotropy in one direction within each of the flat surfaces.

Technological Example 7. The flaky magnetic metal particles according to Technological examples 1, 2, 3, 4, 5, or 6, wherein the magnetization behavior of the flaky magnetic metal particles proceeds by domain wall displacement.

Technological Example 8. The flaky magnetic metal particles according to examples 1, 2, 3, 4, 5, or 6, wherein the magnetization behavior of the flaky magnetic metal particles proceeds by rotation magnetization.

Technological Example 9. The flaky magnetic metal particles according to Technological examples 1, 2, 3, 4, 5, 6, 7, or 8, wherein at least a portion of the surface of one of the flaky magnetic metal particles is covered with a coating layer having a thickness of between 0.1 nm and 1 μm inclusive and containing at least one secondary element selected from oxygen (O), carbon (C), nitrogen (N) and fluorine (F).

Technological Example 10. A pressed powder material including:
- the flaky magnetic metal particles according to Technological examples 1, 2, 3, 4, 5, 6, 7, 8, or 9; and
- an interposed phase existing between the flaky magnetic metal particles and containing at least one secondary element selected from oxygen (O), carbon (C), nitrogen (N) and fluorine (F).

Technological Example 11. The pressed powder material according to Technological example 10, wherein the flat surfaces of the flaky magnetic metal particles are oriented in layers so as to be parallel to one another.

Technological Example 12. The pressed powder material according to Technological examples 10, or 11, wherein the interposed phase includes an oxide having an eutectic system containing at least two third elements selected from the group consisting of boron (B), silicon (Si), chromium (Cr), molybdenum (Mo), niobium (Nb), lithium (Li), barium (Ba), zinc (Zn), lanthanum (La), phosphorus (P), aluminum (Al), germanium (Ge), tungsten (W), sodium (Na), titanium (Ti), arsenic (As), vanadium (V), calcium (Ca), bismuth (Bi), lead (Pb), tellurium (Te) and tin (Sn), and having a softening point of between 200° C. and 600° C. inclusive and a coefficient of thermal expansion of between $0.5 \times 10^{-6}/°$ C. and $40 \times 10^{-6}/°$ C. inclusive.

Technological Example 13. The pressed powder material according to Technological example 12, wherein the interposed phase includes the oxide having the eutectic system containing at least two fourth elements selected from boron (B), bismuth (Bi), silicon (Si), zinc (Zn) and lead (Pb), and having a softening point of between 400° C. and 500° C. inclusive.

Technological Example 14. The pressed powder material according to Technological examples 12, or 13, wherein the eutectic system has eutectic particles having a particle size of between 10 nm and 10 μm inclusive.

Technological Example 15. The pressed powder material according to Technological examples 12, 13, or 14, wherein the interposed phase further includes intermediately interposed particles having a softening point higher than the softening point of the eutectic system and containing at least one of the secondary elements.

Technological Example 16. The pressed powder material according to Technological examples 10, 11, 12, 13, 14, or 15, wherein the interposed phase includes a resin.

Technological Example 17. The pressed powder material according to Technological examples 10, 11, 12, 13, 14, 15, or 16, wherein the interposed phase contains at least one magnetic metal selected from iron (Fe), cobalt (Co) and nickel (Ni).

Technological Example 18. A rotating electric machine including the flaky magnetic metal particles according to examples 1, 2, 3, 4, 5, 6, 7, 8, or 9.

Technological Example 19. A motor including the flaky magnetic metal particles according to Technological examples 1, 2, 3, 4, 5, 6, 7, 8, or 9.

Technological Example 20. A generator including the flaky magnetic metal particles according to examples 1, 2, 3, 4, 5, 6, 7, 8, or 9.

What is claimed is:

1. A plurality of flaky magnetic metal particles, each of the flaky magnetic metal panicles comprising:
   a first magnetic particle comprising
   a flat surface,
   at least one first element selected from the group consisting of Fe, Co and Ni, an average ratio between the maximum length and the minimum length in the flat surface being between 1 and 5 inclusive, an average thickness of the first magnetic particles being between 10 nm and 100 µm inclusive, an average aspect ratio of the first magnetic particles being between 5 and 10000 inclusive; and a plurality of second magnetic particles disposed directly on the flat surface, an average number of the second magnetic particles being five or more, an average diameter of the second magnetic particles being between 10 nm and 1 µm inclusive, wherein:

the average ratio is defined by a/b and the aspect ratio is defined by [(a+b)/2]/t, where b is the minimum length in the flat surface, a is the maximum length in the flat surface, and t is the thickness of the flattened magnetic metal particle, and the maximum length a and the minimum length b are determined as follows: the flat surface is observed by transmission electron microscopy or is observed by scanning electron microscopy, a line is drawn in a direction perpendicular to a tangent line at each point on the contour line of the flat surface, the length from the line to a point intersecting the contour line on the opposite side is measured and is performed for all points on the contour line, and the maximum lengths a and the minimum lengths b are determined.

2. The flaky magnetic metal particles according to claim 1, wherein the CV value of the flaky magnetic metal particles is between 0.1% and 60% inclusive.

3. The flaky magnetic metal particles according to claim 1, wherein the flaky magnetic metal particles have a portion having a crystal structure of a body-centered cubic structure and contain iron (Fe) and cobalt (Co), and the amount of Co is between 10 atom % and 60 atom % inclusive relative to the total amount of Fe and Co.

4. The flaky magnetic metal particles according to claim 1, wherein the lattice strain of the flaky magnetic metal particles is between 0.01% and 10% inclusive.

5. The flaky magnetic metal particles according to claim 1, Wherein the flat surface is oriented in the (110) direction.

6. The flaky magnetic metal particles according to claim 1, wherein the flaky magnetic metal particles have magnetic anisotropy in one direction within each of the flat surfaces.

7. The flaky magnetic metal particles according to claim 1, wherein the magnetization behavior of the flaky magnetic metal particles proceeds by domain wall displacement.

8. The flaky magnetic metal particles according to claim 1, wherein the magnetization behavior of the flaky magnetic metal particles proceeds by rotation magnetization.

9. The flaky magnetic metal particles according to claim 1, wherein at least a portion of the surface of one of the flaky magnetic metal particles is covered with a coating layer having a thickness of between 0.1 nm and 1 µm inclusive and comprising at least one secondary element selected from oxygen (O), carbon (C), nitrogen (N) and fluorine (F).

10. A pressed powder material comprising:

the flaky magnetic metal particles according to claim 1; and an interposed phase existing between the flaky magnetic metal particles and comprising at least one secondary element selected from oxygen (O), carbon (C), nitrogen (N) and fluorine (F).

11. The pressed powder material according to claim 10, wherein the flat surfaces of the flaky magnetic metal particles are oriented in layers so as to be parallel to one another.

12. The pressed powder material according to claim 10, wherein the interposed phase comprises an oxide having an eutectic system comprising at least two third elements selected from the group consisting of boron (B), silicon (Si), chromium (Cr), molybdenum (Mo), niobium (Nb), lithium (Li), barium (Ba), zinc (Zn), lanthanum (La), phosphorus (P), aluminum (Al), germanium (Ge), tungsten (W), sodium (Na), titanium (Ti), arsenic (As), vanadium (V), calcium (Ca), bismuth (Bi), lead (Pb), tellurium (Te) and tin (Sn) and having a softening point of between 200° C. and 600° C. inclusive and a coefficient of thermal expansion of between $0.5 \times 10^{-6}$/° C. and $40 \times 10^{-6}$/° C. inclusive.

13. The pressed powder material according to claim 12, wherein the interposed phase comprises the oxide having the eutectic system comprising at least two fourth elements selected from boron (B), bismuth (Bi), silicon (Si), zinc (Zn) and lead (Pb), and having a softening point of between 400° C. and 500° C. inclusive.

14. The pressed powder material according to claim 12, wherein the eutectic system comprises eutectic particles having a particle size of between 10 nm and 10 µm inclusive.

15. The pressed powder material according to claim 12, wherein the interposed phase further comprises intermediately interposed particles having a softening point higher than the softening point of the eutectic system and containing at least one of the secondary elements.

16. The pressed powder material according to claim 10, wherein the interposed phase comprises a resin.

17. The pressed powder material according to claim 10, wherein the interposed phase comprises at least one magnetic metal selected from iron (Fe), cobalt (Co) and nickel (Ni).

18. A rotating electric machine comprising the flaky magnetic metal particles according to claim 1.

19. A motor comprising the flaky magnetic metal particles according to claim 1.

20. A generator comprising the flaky magnetic metal particles according to claim 1.

* * * * *